(12) United States Patent
Moon

(10) Patent No.: US 12,063,213 B2
(45) Date of Patent: Aug. 13, 2024

(54) SECURE PEER-TO-PEER BASED COMMUNICATION SESSIONS VIA NETWORK OPERATING SYSTEM IN SECURE DATA NETWORK

(71) Applicant: WhiteStar Communications, Inc., Durham, NC (US)

(72) Inventor: Billy Gayle Moon, Apex, NC (US)

(73) Assignee: WhiteStar Communications, Inc., Durham, NC (US)

( * ) Notice: Subject to any disclaimer, the term of this patent is extended or adjusted under 35 U.S.C. 154(b) by 0 days.

(21) Appl. No.: 18/237,963

(22) Filed: Aug. 25, 2023

(65) Prior Publication Data

US 2023/0403267 A1 Dec. 14, 2023

Related U.S. Application Data

(63) Continuation of application No. 17/388,162, filed on Jul. 29, 2021, now Pat. No. 11,792,186.

(51) Int. Cl.
  *H04L 29/06* (2006.01)
  *H04L 9/30* (2006.01)
  *H04L 9/40* (2022.01)

(52) U.S. Cl.
  CPC ............ *H04L 63/0853* (2013.01); *H04L 9/30* (2013.01); *H04L 63/0442* (2013.01)

(58) Field of Classification Search
  None
  See application file for complete search history.

(56) References Cited

U.S. PATENT DOCUMENTS 7,792,989 B2  9/2010  Toebes et al.
7,818,607 B2  10/2010 Turner et al.
(Continued)

OTHER PUBLICATIONS

"4-Way Handshake", Jan. 24, 2019, [online], [retrieved on Jun. 1, 2021]. Retrieved from the Internet: URL: <https://www.wifi-professionals.com/2019/01/4-way-handshake>, pp. 1-21.
(Continued)

*Primary Examiner* — Bradley W Holder
(74) *Attorney, Agent, or Firm* — Leon R. Turkevich

(57) ABSTRACT

In one embodiment, a method comprises: receiving, by a secure executable container executed by an endpoint device, a request from an originating entity for initiating a secure peer-to-peer communication with a second network entity via a secure data network, the originating entity and second network entity having established a two-way trusted relationship in the secure data network; processing, by the secure executable container, the request based on providing the originating entity sole and exclusive authority to control the secure peer-to-peer communication, including cryptographically secure termination and removal of the secure peer-to-peer communication from any network device in the secure data network; and initiating, by the secure executable container, the secure peer-to-peer communication by securely sending, to the second network entity via the secure data network, a secure peer-to-peer invitation for the second network entity to join the secure peer-to-peer communication.

20 Claims, 12 Drawing Sheets

(56) References Cited

U.S. PATENT DOCUMENTS

| | | | |
|---|---|---|---|
| 8,225,091 | B1 | 7/2012 | Pimentel |
| 2003/0105812 | A1* | 6/2003 | Flowers, Jr. .......... H04L 63/029 709/203 |
| 2003/0233551 | A1* | 12/2003 | Kouznetsov ........ G06F 16/1837 707/E17.119 |
| 2005/0086300 | A1* | 4/2005 | Yeager .................. H04L 69/329 709/204 |
| 2009/0187978 | A1* | 7/2009 | Upendran ............. H04L 63/123 726/5 |
| 2017/0111335 | A1 | 4/2017 | Hibbert et al. |
| 2018/0332079 | A1 | 11/2018 | Ashley et al. |
| 2020/0366648 | A1 | 11/2020 | Kuppannan et al. |
| 2021/0026535 | A1 | 1/2021 | Moon |
| 2021/0026976 | A1 | 1/2021 | Moon |
| 2021/0028940 | A1 | 1/2021 | Moon |
| 2021/0028943 | A1 | 1/2021 | Moon |
| 2021/0029092 | A1 | 1/2021 | Moon |
| 2021/0029125 | A1 | 1/2021 | Moon |
| 2021/0029126 | A1 | 1/2021 | Moon |
| 2021/0081524 | A1 | 3/2021 | Moon |
| 2022/0399995 | A1 | 12/2022 | Moon |
| 2022/0400102 | A1 | 12/2022 | Moon |
| 2022/0417264 | A1 | 12/2022 | Moon |
| 2023/0012373 | A1 | 1/2023 | Moon |
| 2023/0020504 | A1 | 1/2023 | Moon |
| 2023/0030829 | A1 | 2/2023 | Moon |
| 2023/0033192 | A1 | 2/2023 | Sutherland et al. |

OTHER PUBLICATIONS

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf. org/pdf/draft-ietf-6lo-ap-nd-06.pdf>, pp. 1-22.

Lehembre, "Wi-Fi-security—WEP, WPA and WPA2", Jun. 2005, [online], [retrieved on Jun. 1, 2021]. Retrieved from the Internet: URL: <http://tele1.dee.fct.unl.pt/rit2_2015_2016/files/hakin9_wifi_EN.pdf>, 14 pages.

Leach et al., "A Universally Unique IDentifier (UUID) URN Namespace", Network Working Group, Request for Comments: 4122, Jul. 2005, [online], [retrieved on May 20, 2021]. Retrieved from the Internet: URL: <https://www.rfc-editor.org/rfc/pdfrfc/rfc4122.txt.pdf>, pp. 1-32.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., et al., "Registration Extensions for IPV6 over Low-Power Wireless Personal Area Network (6LoWPAN) Neighbor Discovery", [online], Internet Engineering Task Force (IETF), Request for Comments: 8505, Nov. 2018, [retrieved on Nov. 16, 2018]. Retrieved from the Internet: <https://tools.ietf.org/pdf/rfc8505.pdf>, pp. 1-47.

Wikipedia, "Pretty Good Privacy", May 16, 2021, [online], [retrieved on Jul. 22, 2021]. Retrieved from the Internet: URL: <https://en.wikipedia.org/w/index.php?title=Pretty_Good_Privacy&oldid=1023418223>, pp. 1-8.

Callas et al., "OpenPGP Message Format", Network Working Group, Request for Comments: 4880, Nov. 2007, [online], [retrieved on Oct. 28, 2021]. Retrieved from the Internet: URL: <https://www.rfc-editor.org/rfc/pdfrfc/fc4880.txt.pdf>, pp. 1-90.

Society video, "SOCIETY Secure Messenger: The world's most secure way to chat", Text and Screenshots, (Mar. 10, 2020), [online], [Retrieved on Mar. 3, 2022]. Retrieved from the Internet: URL: <https://www.youtube.com/watch?v=jSRmnseSCVA>, 9 pages.

Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.

Society video, "Society's Best in Class Security and the Cohort System", Text, Transcript, and Screenshots, (Mar. 26, 2020), [online], [Retrieved on Mar. 3, 2022]. Retrieved from the Internet: URL: <https://www.youtube.com/watch?v=dwUlktWMMoc>, 11 pages.

Society video, "SOCIETY Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jIVTcQmADw>, 5 pages.

Society video, "SOCIETY Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.

Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.

Society video, "SOCIETY Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.

Society video, "SOCIETY Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

* cited by examiner

SECURE PEER-TO-PEER BASED COMMUNICATION SESSIONS VIA NETWORK OPERATING SYSTEM IN SECURE DATA NETWORK

CROSS-REFERENCE TO RELATED APPLICATIONS

This application is a continuation of U.S. application Ser. No. 17/388,162, filed Jul. 29, 2021, issued Oct. 17, 2023 as U.S. Pat. No. 11,792,186, the disclosure of which is incorporated herein in its entirety by reference.

STATEMENT REGARDING PRIOR DISCLOSURES BY THE INVENTOR OR A JOINT INVENTOR

The following U.S. Patent Publications do not qualify as prior art under 35 USC 102(b)(1)(A) because their Jan. 28, 2021 publications are (1) one year or less before the effective filing date of the claimed invention, and (2) by the inventor or a joint inventor: U.S. Pub. 2021/0026535; U.S. Pub. 2021/0026976; U.S. Pub. 2021/0028940; U.S. Pub. 2021/0028943; U.S. Pub. 2021/0029092; U.S. Pub. 2021/0029125; and U.S Pub. 2021/0029126, the disclosures all of which are incorporated herein by reference to the extent not inconsistent with this application.

TECHNICAL FIELD

The present disclosure generally relates to secure peer-to-peer based communication sessions via a network operating system in a secure data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Protocol (IP) has enabled the Internet to evolve from a set of connected research institutions and universities to a world wide web of connected IP devices that enables worldwide communications between user-controlled devices ("user devices"), Internet of Things (IoT) devices (devices that do not require user control), and server devices providing ever-increasing cloud-based based services such as social networking services, business transaction services, media distribution services, data storage services, etc. The enormous success of the Internet is based on the deployment of IP routing protocols that enable a "source" device (having a corresponding "source IP address") that is connected to the Internet to reach a "destination" device (having a corresponding "destination IP address") that also is connected to the Internet.

This universal reachability also has introduced severe security threats to each and every IP device that is connected to the Internet, because any "threat device" originating at a "source" IP address (e.g., a malfunctioning network device infected by malware or a network device operated by a malicious user) can threaten any "target device" at a "destination" IP address in an attempt to steal private data, disrupt the target device, etc. Hence, this universal reachability has resulted in losses on the order of billions (or even trillions) of dollars in losses due to attacks on targeted devices, including attacks on personal devices, as well as attacks on large-scale corporate, government, and/or military networks. Individuals and institutions collectively have expended billions of dollars in network security in an attempt to thwart or mitigate against online attacks, yet malicious users still have been able to overcome network security attempts.

Existing security threats in the Internet can exploit a user entity (e.g., business, association, government agency, etc.) acquiring a user "identity" that enables the user entity to be reached via the Internet. For example, a user entity can acquire a Uniform Resource Identifier (URI) from a prescribed naming authority (e.g., ICANN), and associate the URI with one or more domain name services (DNS); a user entity also can acquire a "social network identity" on an Internet-based service provider (e.g., Facebook, Twitter, etc.). The exposure of a user identity (e.g., URIs, social network identities) enables executable web crawlers of Internet search engines (e.g., Google, Bing, Yahoo, DuckDuckGo, etc.) or Internet-based service providers to data mine user metadata of the user entities, execute analytics to exploit the user metadata, implement unauthorized monetizing of the user metadata, and send unwanted web content to the user (e.g., targeted advertisements, addictive web content targeted for the user, etc.).

Existing messaging systems also can expose network users to security threats due to uncontrolled messaging (e.g., email, text messages, voice calls, etc.), that results in receipt of unwanted messages (spam, phishing, robocalls, etc.). Attempts to block messages can be circumvented by a sending party using a different identity (e.g., different phone number, different email address, etc.). Existing messaging systems also do not prevent a message recipient from unauthorized addition of additional network users to a message thread, nor do existing messaging systems prevent a message recipient from unauthorized distribution of media content provided by a message originator, for example a private picture, message, etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
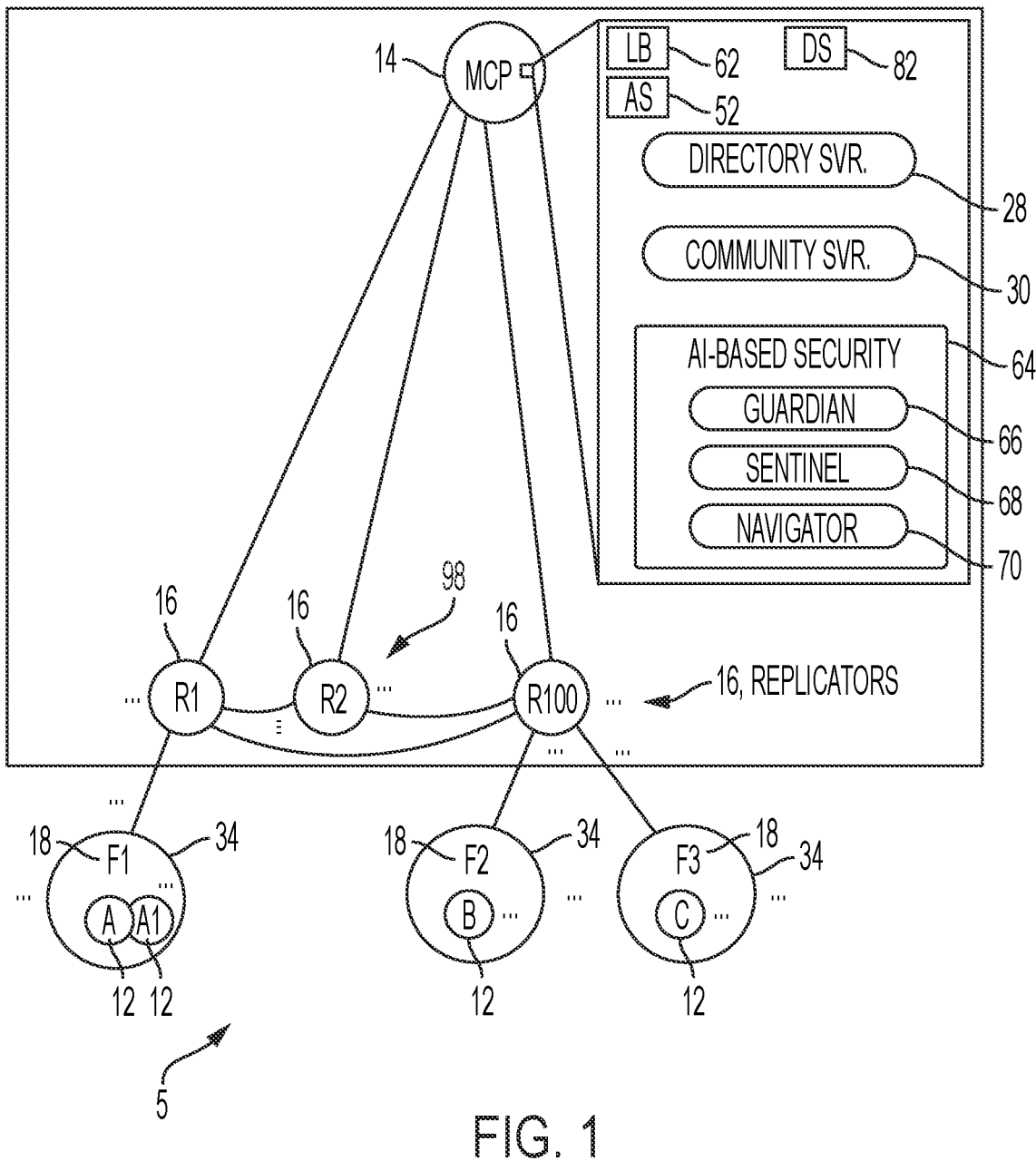
FIG. 1 illustrates a secure peer-to-peer data network comprising an apparatus executing secure peer-to-peer communication sessions via a network operating system in a secure peer-to-peer data network, according to an example embodiment.

In one embodiment, a method comprises: receiving, by a secure executable container executed by an endpoint device, a request from an originating entity for initiating a secure peer-to-peer communication with a second network entity via a secure data network, the originating entity having established a two-way trusted relationship with the endpoint device in the secure data network, the originating entity further having established a corresponding two-way trusted relationship with the second network entity in the secure data network; processing, by the secure executable container, the request based on providing the originating entity a sole and exclusive authority to control the secure peer-to-peer communication, including cryptographically secure termination and removal of the secure peer-to-peer communication from any network device connected to the secure data network; and initiating, by the secure executable container, the secure peer-to-peer communication based on securely sending, to the second network entity via the secure data network, a secure peer-to-peer invitation for the second network entity to join the secure peer-to-peer communication with the originating entity, enabling the second network entity to selectively join the secure peer-to-peer communication.

In another embodiment, one or more non-transitory tangible media is encoded with logic for execution by a machine and when executed by the machine operable for: receiving, by the one or more non-transitory tangible media implemented as a secure executable container that is executed by the machine implemented as an endpoint device, a request from an originating entity for initiating a secure peer-to-peer communication with a second network entity via a secure data network, the originating entity having established a two-way trusted relationship with the endpoint device in the secure data network, the originating entity further having established a corresponding two-way trusted relationship with the second network entity in the secure data network; processing the request based on providing the originating entity a sole and exclusive authority to control the secure peer-to-peer communication, including cryptographically secure termination and removal of the secure peer-to-peer communication from any network device connected to the secure data network; and initiating the secure peer-to-peer communication based on securely sending, to the second network entity via the secure data network, a secure peer-to-peer invitation for the second network entity to join the secure peer-to-peer communication with the originating entity, enabling the second network entity to selectively join the secure peer-to-peer communication.

In another embodiment, an apparatus comprises apparatus implemented as a physical machine, the apparatus comprising: non-transitory machine readable media configured for storing executable machine readable code implemented as a secure executable container; a device interface circuit; and a processor circuit. The processor circuit is configured for executing the machine readable code, and when executing the machine readable code operable for: receiving, by the secure executable container, a request from an originating entity for initiating a secure peer-to-peer communication with a second network entity via a secure data network, the apparatus implemented as an endpoint device, the originating entity having established a two-way trusted relationship with the endpoint device in the secure data network, the originating entity further having established a corresponding two-way trusted relationship with the second network entity in the secure data network; processing, by the secure executable container, the request based on providing the originating entity a sole and exclusive authority to control the secure peer-to-peer communication, including cryptographically secure termination and removal of the secure peer-to-peer communication from any network device connected to the secure data network, and initiating, by the secure executable container, the secure peer-to-peer communication based on securely sending, to the second network entity via the secure data network, a secure peer-to-peer invitation for the second network entity to join the secure peer-to-peer communication with the originating entity, enabling the second network entity to selectively join the secure peer-to-peer communication.

Detailed Description

Particular embodiments enable a secure peer-to-peer communication in a secure peer-to-peer data network, based on distributed execution of secure executable containers implemented as network operating systems in each network device of the secure peer-to-peer data network.

The secure peer-to-peer communication session is via a network operating system in a secure peer-to-peer data network (e.g., secure messaging sessions such as secure "chat" sessions or secure email sessions, secure videoconference sessions, etc., between network entities), and is based on the strict security enforcement by the network operating system executed by any network device within the secure peer-to-peer data network, for example a user endpoint device controlled by a user entity, a replicator device having a two-way trusted relationship with the endpoint device, and/or a core network device having a two-way trusted relationship with the replicator device. The network operating system, implemented within every network device in the secure peer-to-peer data network, provides exclusive access to the secure peer-to-peer data network; in other words, the network operating system (also referred to herein as a "secure executable container") prevents any executable resource in the corresponding network device from accessing any unencrypted form of any "at-rest" or "in-flight" secure data structures, or accessing the secure peer-to-peer data network, without authorized access via a prescribed Application Programming Interface (API) required by the network operating system.

A fundamental problem with existing Internet technology is that the Internet was architected at the network layer (layer 3) with an Internet Protocol (IP) that merely routed data packets between a source device and a destination device, with no regard for anti-fraud protection, protecting user identities, etc. The worldwide deployment of the Internet using Internet Protocol at the network layer thus exposed network devices connected to the Internet to malicious attacks, unauthorized monitoring of user communications, and exploitation of user identities by service providers that have executed machine learning of user behaviors in order to identify targeted advertising to Internet users, including targeting addictive content.

Moreover, the use of Internet Protocol at the network layer, without any regard for anti-fraud protection or user identity protection at the network layer, resulted in implementing security-based network services (e.g., protecting owned content, building directories, building ontologies, providing security, etc.) "above" the layer 3 (network) layer, typically at the application layer; unfortunately, implementing security-based network services at the application layer cannot prevent a malicious user from reaching a target via the layer 3 Internet, especially since a malicious user often can bypass the OSI (Open Systems Interconnect) protocol stack using unencrypted "raw" data packets that can bypass a TCP/IP stack.

In contrast, the network operating system according to example embodiments maintains exclusive control over all access to the secure peer-to-peer data network and access to any data structure associated with the secure peer-to-peer data network, including any and all user metadata for any user accessing the secure peer-to-peer data network. Further, the network operating system establishes an identity management system that requires a user to verify their identity upon initial registration in the secure peer-to-peer data network, and requires the user to establish a two-way trusted relationship with their endpoint device and any other network entity in the secure peer-to-peer data network.

Consequently, the network operating system can provide a secure peer-to-peer communication session via a network operating system in a secure peer-to-peer data network, based on authoritative establishment by an originating entity of a secure peer-to-peer communication with at least a second network entity having a two-way trusted relationship with the originating entity, where: (1) the originating entity retains sole and exclusive authority to control the secure peer-to-peer communication session; and (2) any other entity having a two-way trusted relationship with the originating entity cannot be added to the secure peer-to-peer communication session unless the other entity first accepts an invitation to selectively join the secure peer-to-peer communication session. In other words, the originating entity cannot establish a secure peer-to-peer communication session with a second network entity unless the originating entity has established a two-way trusted relationship with the second network entity entity; further, any network entity having a two-way trusted relationship with the originating entity can decline to join the secure peer-to-peer communication session, and any network entity can leave the secure peer-to-peer communication session at any time, causing any content owned by the leaving network entity to be instantly removed from the respective endpoint devices of all other network entities, and any content owned by the other entities to be instantly removed from the endpoint device of the leaving network entity.

Hence, the example embodiments can ensure that network entities (e.g., communication session participants) can enjoy one or more secure peer-to-peer communications (e.g., private secure chat, secure email thread, private secure video conferencing, etc.), while protecting the media ownership rights of each of the participants in the secure peer-to-peer communication. Any change or deletion of any media content by its owner-participant is instantly implemented on each online endpoint device of communication participants. Further, neither participant identity nor participant media content is shared with another participant unless a two-way trusted relationship has been established between the participants.

A description first will be provided of the secure peer-to-peer data network, followed by a description of the secure peer-to-peer communication sessions via a network operating system in a secure peer-to-peer data network, according to an example embodiment.

Secure Private Core Network Overview

FIG. 1 illustrates a secure data network 5 comprising an example secure private core network 10, according to an example embodiment. The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IoT) devices, etc. The secure private core network 10 comprises a master control program (MCP) device 14, and one or more replicator devices (e.g., "R1") 16. Each replicator device 16 can be connected to every other replicator device 16, forming a pairwise topology (e.g., a "mesh") 98 of interconnected replicator devices 16; each replicator device 16 also is connected to the MCP device 14; hence, each replicator device 16 provides a connection to zero or more endpoint devices 12 for reaching the MCP device 14 and/or another endpoint device 12, described in further detail below. The devices 12 also can have peer to peer connections to one another allowing direct communications without the aid of the core network 10 (hence the name hybrid peer to peer network). Devices 12 can simultaneously communicate either exclusively with each other, peer to peer, with some devices peer to peer and other devices via the core network 10 or with all other devices 12 via the core network 10.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Since an individual person (or identified organization) may utilize one or more endpoint devices 12 for network communications, the secure private core network 10 can identify an individual person (or identified organization) based on the allocation of a "federation" identifier (illustrated as "F1") 18 that has a verified secure relationship with one or more physical network devices (e.g., "A" 12, "A1" 12, etc.) that are utilized by the individual person (or identified organization) for communications within the secure data network 5; hence, the secure data network 5 also is referred to herein as a "secure peer-to-peer data network" based on the trusted aggregation of two-way trusted relationships. As described below, the federation ID 18 is generated by an endpoint device 12 during initial registration of a user (e.g., individual person or identified organization) using a secure random number generator that results in a universally unique identifier (UUID) of at least one-hundred twenty eight (128) bits: an example 128-bit UUID can be implemented as proposed by the Internet Engineering Task Force (IETF) (see RFC 4122).

Figure 2:
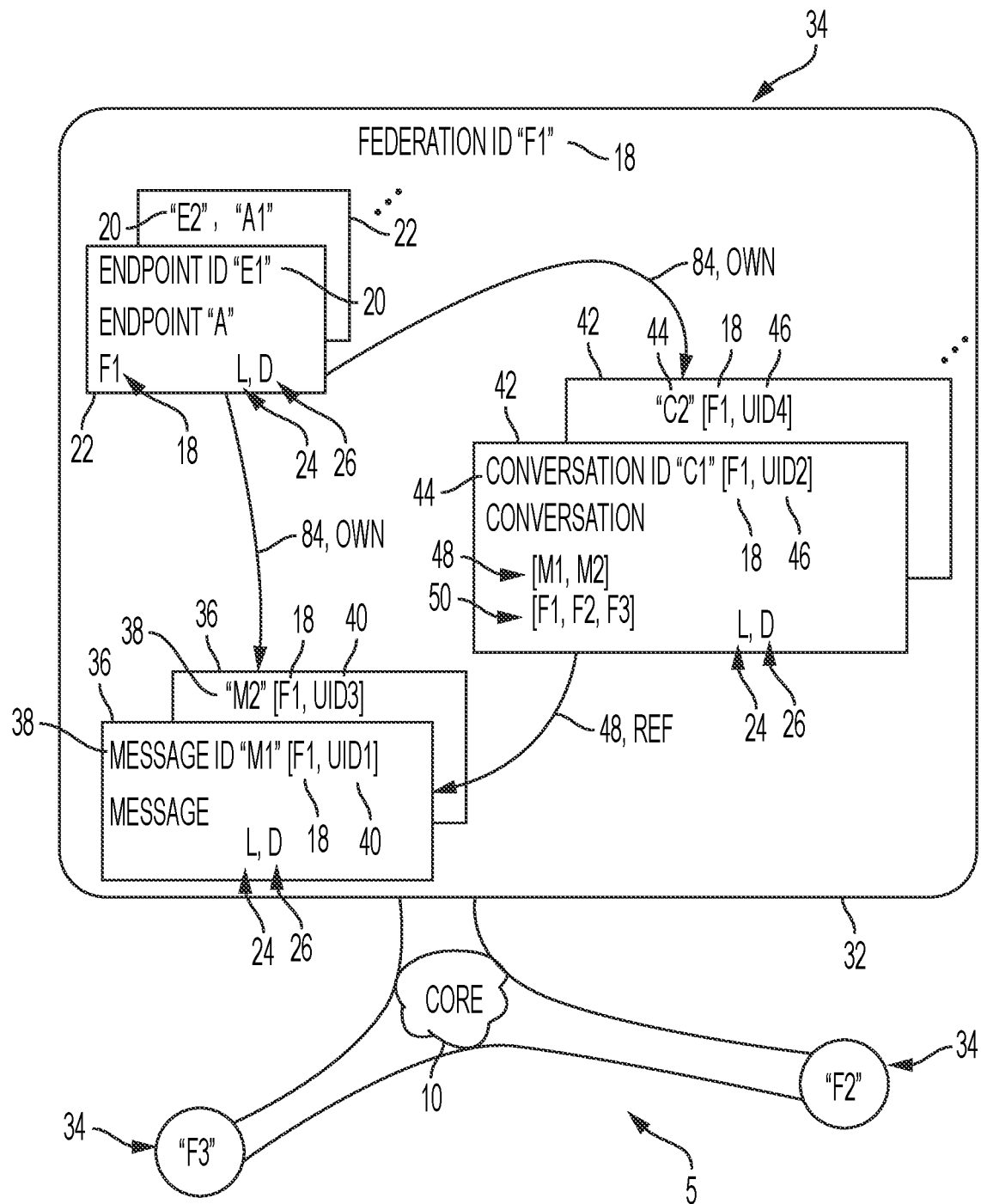
FIG. 2 illustrates example data structures generated and/or stored by an endpoint device associated with a federation identifier owned by a requesting user, for establishment and maintenance of two-way trusted relationships in the secure peer-to-peer data network, according to an example embodiment.

FIG. 2 illustrates example data structures that can identify secure relationships between different entities, for example different endpoint devices 12, different individual persons or organizations, etc. The secure private core network 10 causes each endpoint device 12 during registration with the secure private core network 10 to securely and randomly generate its own self-assigned 128-bit UUID as a unique endpoint identifier 20: the endpoint ID 20 is stored in a data structure referred to as an endpoint object 22 that stores all attributes associated with the corresponding endpoint device 12 in the secure data network 5. As illustrated in FIG. 2 and as described in further detail below, the secure private core network 10 can cause the endpoint device "A" 12 to generate its own endpoint identifier "E1" 20; the secure private core network 10 also can cause the endpoint device "A1" 12 to generate its own endpoint identifier "E2" 20. The endpoint ID 20 provides a permanent (i.e., unchangeable) cryptographically-unique identity for the endpoint device "A" 12.

Each physical device, including each endpoint device 12, is uniquely identified in the secure private core network 10 based on its corresponding endpoint object 22. The endpoint object 22 for each physical device can specify its corresponding endpoint ID 20, the federation ID 18 of the federation 34 to which the physical device belongs, a corresponding lifecycle policy "L" 24, and a corresponding distribution policy "D" 26, described below. The endpoint object 22 for each physical device also can identify a corresponding device type, for example a "human interface" (user interface device), a "thing" (e.g., IoT device, mass storage device, processor device), or a core network component (e.g., an MCP device 14, a replicator device 16, a directory server 28, a community server 30, etc.); hence, a particular device type as specified in the endpoint object 22 can cause the corresponding physical device (e.g., an endpoint device 12), to be allocated or granted selected attributes within the secure private core network 10. Each endpoint object 22 is securely stored in its corresponding physical device in which it represents, and also can be securely stored in other physical devices upon establishment of a two-way trusted relationship, described below.

A federation object 32 is a data structure that has its own unique federation ID 18 and comprises one or more endpoint objects 22: the federation object 32 is established upon secure registration of the first endpoint device 12 and establishment of its corresponding endpoint object 22. As described previously, an individual person (or identified organization) may utilize one or more endpoint devices 12 for network communications; hence, each endpoint object 22 is added to the federation object 32 in response to determining that the corresponding endpoint device (e.g., "A1") 12 has a two-way trusted relationship with a user (or organization) that has previously executed a secure registration with another endpoint device (e.g., "A") 12 in the same federation 32, described below. Hence, the secure private core network 10 can identify an individual person (or identified organization) based on a corresponding federation ID 18 that identifies a collection (i.e., "federation") 34 of one or more endpoint devices 12 having been verified by the secure private core network 10 as each having a secure relationship with the identified person or user.

Hence, a "federation entity" (or simply "federation") 34 as described herein is a logical entity in the secure data network 5, expressed in the secure private core network 10 by its corresponding federation object 32, that uniquely identifies the federation of secured endpoint devices 12 (identified by respective endpoint objects 22) that have a two-way trusted relationship with an individual user or organization. The secure private core network 10 establishes a trusted aggregation of strict two-way trusted relationships between two entities, where each endpoint device 12 of each federation 34 has its own permanent (i.e., unchangeable) and cryptographically-unique endpoint ID 20.

An endpoint device 12 in a federation 34 can generate content as a message object 36 that can be securely stored in one or more endpoint devices 12 in the federation 32. A message object can have different types including messages created within the secure private core network 10 (e.g., a notification object generated by an endpoint device 12 in the secure private core network 10), user created content from a user device 12 (e.g., a text message, an image, a media file, a media stream, etc.), or machine-created content from an IoT device (e.g., a sensor-based data record or media stream, an actuator message, etc.). A message object 36 is identified by a corresponding 256-bit unique message identifier 38 (illustrated in FIG. 2 as "M1" and "M2"): the message ID 38 comprises the federation ID 18 of the federation 34 in which the content was generated, and a corresponding 128-bit message UUID (e.g., "UID1") 40 that is generated by the endpoint device 12 in the federation 34 that generated the content. As described in further detail below, the generation of a message ID 38 that comprises the federation ID 18 provides an ownership reference 84 that establishes an absolute and exclusive ownership right in the content created by the federation 34, such that the content owner of the content in the message object 36 can be identified based on the federation ID 18 in the message ID 38. The message object 36 also can include a corresponding lifecycle policy "L" 24 (identifying for example an expiration date and time that identifies an instance that the associated content is to be automatically deleted from any physical storage device in the secure data network 5), and a corresponding distribution policy "D" 26 (identifying for example a distribution scope such as can only be shared by two users in succession, a distribution start or stop time for granting free access to media content for only one week before or after a concert performance date that is independent of replication of the media content throughout the secure data network 5, etc.). An endpoint device 12 in the federation 34 can distribute content that is stored in a message object 36 based on the endpoint device 12 generating a conversation object 42 comprising a conversation identifier (illustrated as "C1", "C2") 44 that comprises the federation ID 18 and a corresponding 128-bit conversation UUID (e.g., "UID2") 46 that is generated by the endpoint device 12 initiating the distribution of the content (i.e., initiating the "conversation"). The conversation object 42 can be of different types, for example a "post", a "community", a "vault" file system (for secure storage of selected messages at one or more locations). Each conversation object 42 can reference zero or more message objects 36, and therefore can optionally include a message reference (or message "list") 48 of one or more message objects (e.g., "M1", "M2"); each conversation object 42 also can include a subscriber list 50 specifying at least the federation ID 18 of the federation 34 that created the conversation object 42 (e.g., that created the content in the referenced messages "M1" and "M2" from the message reference 48). A given message (e.g., "M2") can be referenced in more than one conversation object (e.g., "C2"), enabling the message (e.g., "M2") to be replicated to different subscribers (e.g., federation "F2" 34 and federation "F3" 34) specified in the subscriber list 50 according to different policies specified by the corresponding lifecycle policy "L" 24 and the corresponding distribution policy "D" 26 in the conversation object "C2"; hence, the same message object 36 need not be duplicated as separate instances. Hence, a message ID 38 can be distributed according to different policies based on utilizing different conversation objects 42. Additional details regarding managing lifecycles for digital conversations can be found, for example, in U.S. Patent Publication No. 2021/0028940.

The federation object 32 can be implemented as a collection of the endpoint objects 22, message objects 36, and conversation objects that specify the same federation ID 18 as owner of the objects. In other words, the ownership within the same federation 34 is established based on storage of the same federation ID 18: within each endpoint object 22; within the message identifier 38 of each message object 36; and/or within the conversation identifier 44 of each conversation object 42. Hence, the federation object 32 can be implemented based on the federation ID 18 providing a reference to the owned endpoint objects 22, message objects 36, and conversation objects that can be stored at different locations within the memory circuit (94 of FIG. 4) of a physical network device; as a result, the federation object 32 need not be implemented as a discrete data structure that includes the owned objects 22, 36, and 38 stored therein.

Hence, each federation 34 in the secure data network 5 is a collection of one or more secured endpoint devices 12 (identified in the secure private core network 10 by its corresponding endpoint object 22) each of which have a two-way trusted relationship with an individual user or organization: each federation 34 is allocated a corresponding federation object 32 having a corresponding unique federation ID 18 that uniquely identifies the federation 34 in the secure data network 5. The federation object 32 can be stored in a memory circuit (94 of FIG. 4) of any one or more of the endpoint devices (e.g., "A") 12 of the federation "F1" 34.

An endpoint device "A1" 12 can initiate a prescribed secure salutation protocol with another endpoint device "A" 12 in order to establish a two-way trusted relationship between the two endpoint devices "A" and "A1" 12 in the federation "F1" 34, resulting in exchange of public encryption keys for pairwise sharing of encrypted content that cannot be decrypted by any intermediate device (e.g., a replicator device 16 in between two devices 12); hence, the addition of a new endpoint device (e.g., a new smartphone, a new smart tablet or laptop computer, etc. "A1") 12 by a user into the federation "F1" 34 enables the new endpoint device "A1" to execute a prescribed secure salutation protocol with at least one other endpoint device (e.g., endpoint device "A" 12), enabling the newly added endpoint device "A1" 12 in the federation "F1" 34 to establish a two-way trusted relationship with the other endpoint device (e.g., endpoint device "A" 12"). An example salutation protocol is illustrated in U.S. Patent Publication No. 2021/0029126.

The establishment of a two-way trusted relationship between the two endpoint devices 12 within the federation "F1" 34 enable the two endpoint devices 12 to execute autonomic synchronization of any portion of the data structures 22, 36, and 42 between any other endpoint device (e.g., "A1") 12 within the federation "F1" 34.

In particular, each physical network device (including each endpoint device 12) includes an autonomic synchronizer (52 of FIG. 1) that is configured for autonomically (i.e. automatically by a machine) synchronizing data structures between physical network devices that are trusted peer devices, for example between endpoint devices 12 that are identified as subscribers of the same conversation identifier 44 (based on the subscriber list 50): the autonomic synchronizer 52 can autonomically synchronize data structures between any pair of physical network devices having a two-way trusted relationship based on determining any differential hypercontent state (e.g., stored changes) between the stored data objects 22 identified in the message reference 48: the autonomic synchronizer 52 can reconcile any differential hypercontent state between any data objects 22 stored in different endpoint devices 12, resulting in updating the data objects 22 to a most recent version instantaneously in each endpoint device 12 connected to the secure data network 5; any disconnected endpoint device 12 can execute autonomic synchronization upon reconnection to the secure private core network 10, and/or in response to a local P2P (peer to peer) connection with a trusted peer endpoint device 12 (e.g., within its own federation 34 or another federation 34, as appropriate). Endpoint devices 12 within the same federation 34 also can execute autonomic synchronization of all data structures in the federation object 32 (including the federation object 32 itself), according to the policies set in the respective endpoint object 22. Hence, any endpoint device 12 (e.g., endpoint device "A1" 12) that is offline for some time interval can execute autonomic synchronization for updating of its stored content with the other endpoint devices 12 in its federation 34.

The autonomic synchronizer 52 is configured for executing pairwise synchronization between trusted peer devices 12 in response to each update to a data object. In particular, each and every data object that is created and stored in the secure data network 5 comprises a creation timestamp indicating a time that the data object was created, and a "last change" timestamp (i.e., update timestamp) indicating the last time the data object was updated. Hence, the autonomic synchronizer 52 can execute, in cooperation with a corresponding autonomic synchronizer 52 in a trusted peer device, a pairwise update of an older copy of each data object to the most recently available update based on comparing the relative update timestamps.

The autonomic synchronizer 52 of an endpoint device (e.g., "A") 12 utilizes a "database version number" for each other trusted physical network device (e.g., "A1", "R1", "B", "C", "MCP") in which the endpoint device "A" 12 has established a trusted relationship, resulting in a corresponding pairwise relationship in the database version number between trusted peer devices 12. In response to the trusted peer devices 12 connecting to each other (e.g., either directly via a P2P data link or via the secure private core network 10), the autonomic synchronizers 52 in the trusted peer devices 12 can track their respective database version numbers and in response can update their database versions along with the associated database changes.

Since different endpoint devices can be "online" or "offline" at different instances, a "disconnected" endpoint device (e.g., "A1") can develop changes or "versions" that "drift apart" from the synchronized versions among the trusted peer devices that are connected to the secure private core network 10, for example where a federation owner is updating a message object (e.g., a note or memorandum) 36 using the "disconnected" endpoint device (e.g., "A1"). Hence, the autonomic synchronizer 52 of an endpoint device (e.g., "B") 12 can respond to reconnection with the secure private core network 10 (or a trusted peer device 12 via a P2P data link) by comparing its "database version number" (e.g., the database version number associated with its peer "A") and determine if synchronization is needed.

The autonomic synchronizer 52 also can track changes of all locally-stored data objects based on creating a hash of a database state: the database state represents all locally-stored data objects as tuples of a data object identifier and the "last changed" timestamp. Example locally-stored data objects that can be generated by a federation owner on an endpoint device 12, and replicated and synchronized with other endpoint devices 12, can include: endpoint objects 22; conversation objects 42; message objects 36; outcasted endpoints, conversations and messages that are removed from a federation 34; membership of federations in conversations (e.g., subscriber lists 50); cohorts within a federation; voting state for conversations and messages; a vault file system within a federation; password recovery information for participants in password recovery; "shared" configuration between devices within a federation; etc.

Hence, any one or more of the endpoint devices 12 of a first federation (e.g., "F1") 34 can cause the secure private core network 10 to execute autonomic synchronization of any portion of the data structures 22, 36, and 42 in any other federation (e.g., "F2" or "F3") 34 in which the first federation has established a two-way trusted relationship, based on the subscriber list 50 in a given conversation object 42: the autonomic synchronization is executed in a secure manner that ensures that all data structures always stored securely in a non-transitory machine readable medium, and that all data structures are always transmitted securely, for example via a wireless (or wired) transmission medium.

For example, any data object (e.g., 22, 36, and/or 42) that is generated and stored within an endpoint device 12 (e.g., "A") can be encrypted using its public key (e.g., "KeyP1_A"); any data object that is sent from an originating endpoint device 12 (e.g., "A") to a cohort (e.g., "B") (either within its federation "F1" 34 or in another federation "F2" 34) for secure storage can be encrypted using the originator private key (e.g., "prvKeyP1_A") and the cohort public key (e.g., "Key_B"), and further encrypted using a temporal key prior to transmission to the cohort. The cohort can decrypt the transmitted data object based on the temporal key (described below) and store the object that was encrypted using the originator private key (e.g., "prvKeyP1_A") and the cohort public key (e.g., "Key_B").

As described below, the verified secure relationship is established via a "two-way trusted relationship" that is verified by the MCP device 14 via the first party (e.g., an individual person, organization, or another physical device) and via the second party (e.g., via the physical network device); in other words, no third-party authentication (e.g., by a certifying authority outside the authority of the secure private core network 10) is permitted in the secure private core network 10, nor is any one-way verification permitted in the secure private core network 10; hence, the trusted aggregation of multiple two-way trusted relationships establishes the hybrid peer-to-peer overlay network in the secure private core network 10.

Figure 3:
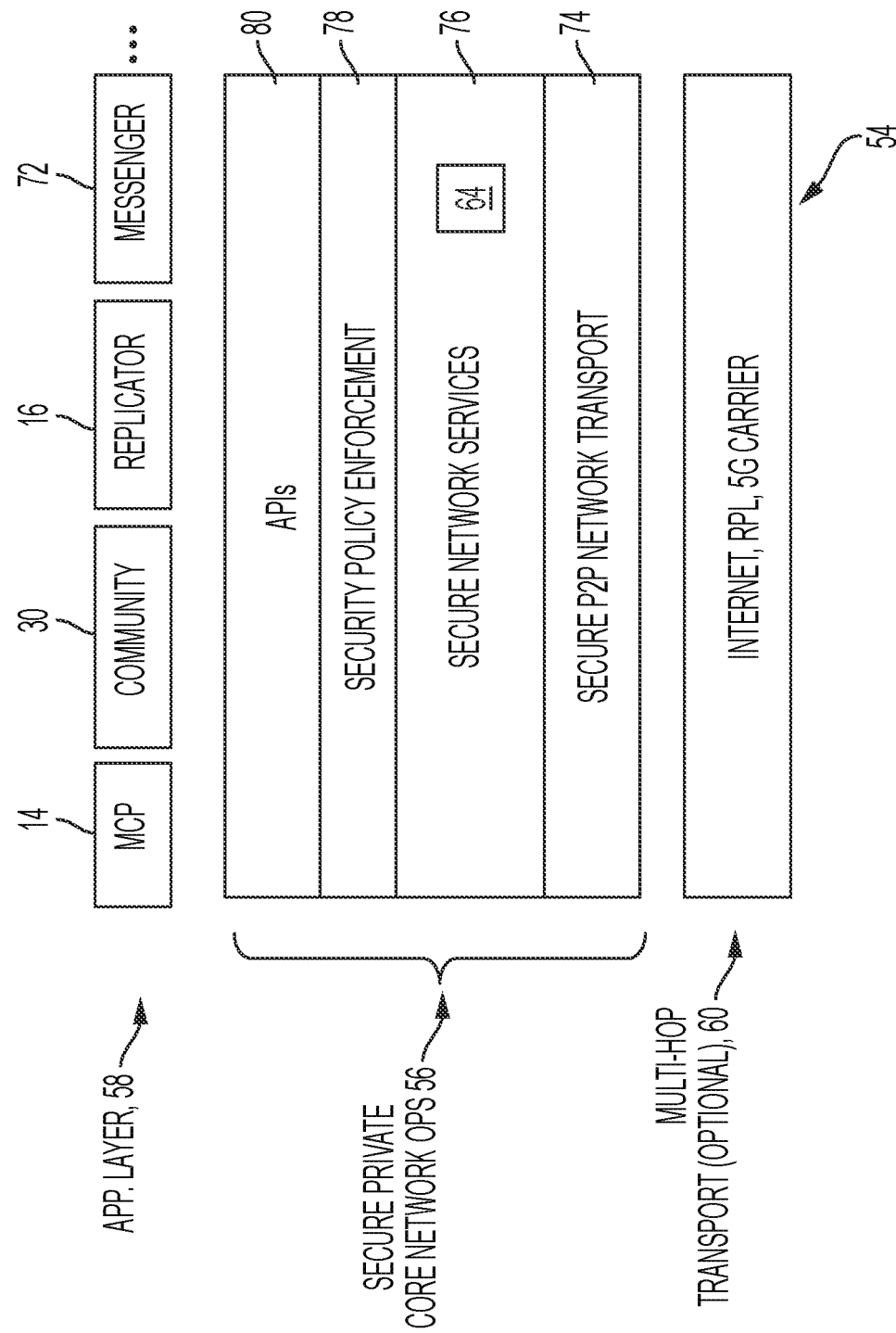
FIG. 3 illustrates an example implementation in an apparatus of executable code configured for providing operations for deployment of the secure peer-to-peer data network, according to an example embodiment.

FIG. 3 illustrates an example implementation 54 in a physical network device (e.g., an endpoint device 12) for deployment of the secure data network 5 in a physical data network, according to an example embodiment. The example implementation 54 includes execution of secure private core network operations 56, and execution of selected application layer resources 58 for formation of the secure data network 5. For example, the application layer resources 58 can include executable application code that causes a physical network device to selectively execute element-specific operations within the secure private core network 10, for example an MCP device 14, a replicator device 16, a community server 30; as shown in FIG. 1, additional application layer resources 58 that can be deployed in the secure private core network 10 by a physical network device (e.g., an endpoint device 12) can include a directory server 28 (hosted in the same network executing the MCP device 14), a community server 30 (hosted in the same physical network device executing the MCP device 14), and a load balancer 62 for allocating each endpoint device 12 to a replicator device 16. The application layer resources 58 also can include a messenger application 72 that enables a user of an endpoint device 12 (e.g., a 5G smart phone) to send and receive content using conversation objects 42, for example in the form of instant messages, public/private forum posts, etc. An example of the messenger application 72 is the commercially available application "Society" from WhiteStar Communications, Inc., Durham, North Carolina, at the website address "https://societyapp.io/".

The secure private core network operations 56 can be executed by each of the physical network devices in the secure data network 5 (including each of the endpoint devices 12) executing machine-executable code that can be implemented in each physical network device in the form of a self-contained "network operating system" (NOS) 56. The "network operating system" 56 can be implemented for deployment on various network device platforms, for example as a native operating system (e.g., for an IoT device or a physical network device dedicated for use in the secure data network 5), or as an executable "app" that can be installed and executed on a device utilizing an operating system such as Android, iOS, Microsoft Windows 10, or any other Unix-based operating system.

The network operating system 56 can include machine-executable code for executing numerous security-based operations in the secure data network 5, including establishment of a secure peer-to-peer (P2P) network transport 74 based on a dynamic generation of a unique encrypted temporal key for each and every data packet that traverses the secure data network 5, providing secure network services 76, providing security policy enforcement 78, and providing application programming interfaces (APIs) 80.

Example secure network services 76, illustrated in FIGS. 1, 3, and 7, can include machine-executable code for executing an Artificial Intelligence (AI) based security service 64 that comprises a guardian service 66, a sentinel service 68, and a navigator service 70. Additional example secure network services 76 can include machine-executable code for executing a prescribed secure salutation protocol with another physical network device (e.g., another endpoint device 12) for establishment of a secure two-way trusted relationship, executing management of messages or conversations (e.g., according to a lifecycle policy "L" 24 and/or a distribution policy "D" 26), executing management of secure and permanent deletion of data objects or an endpoint device 12 from the secure data network 5 ("zeroization"), account management, etc. Another example secure network service 76, illustrated in FIG. 1, includes machine-executable code for executing a distributed search (DS) agent 82: the distributed search (DS) agent 82 can execute AI analytics and generate metadata for AI operations; the distributed search (DS) agent 82 is configured for generation and selected synchronization of "projections" with other distributed search (DS) agents 82 that enable real-time searches to be executed by any endpoint device 12, an MCP device 14, any replicator device 16, a directory server 28 or community server 30, and/or any of the components or executable agents of the AI-based security service 64.

The APIs provide prescribed commands that are available to the application layer resources 58 for execution of the secure private core network operations 56; moreover, the APIs 58 separate application logic from the need for any domain knowledge of the underlying data network that is implementing the secure data network 5. Hence, the example implementation 54 enables application developers to create the application layer resources 58 without any need of domain knowledge, and without any need to learn any security-based protocols, since the secure private core network operations 56 can ensure that the secure data network 5 provides a secure network that can prevent network intrusion.

A problem in prior deployments of cyber security is that no known security system for a user network device maintained cryptographic security of a data packet having an encrypted payload that is received via a data network. To the contrary, at most a resource in a user network device would decrypt the encrypted payload to recover a decrypted payload, and store the decrypted payload as a local data structure in a memory circuit of the user network device. Hence, the storage of the decrypted payload "at rest" within a memory circuit of the user network device exposed the decrypted payload to a potential cyber-attack.

Although existing encryption applications enabled a user to execute encryption of locally-stored data structures on his or her user network device, such encryption applications are executed at the "application layer", resulting in the exposure of the decrypted data packet at the operating system level until a user executes the encryption application in the user network device for encryption of the locally-stored data structures.

Access to the secure private core network 10 by any physical network device 88 requires installation and instantiation of the network operating system 56. Further, the network operating system 56 operates as a secure executable container that only allows access to an internal executable code, access to an "at-rest" or "in-flight" stored data structure, or access to the secure data network 5 only via one or more of the prescribed APIs 80.

Hence, the network operating system 56 prevents any executable resource in a physical network device 88 (or a user of the physical network device 88) from accessing any unencrypted form of any "at-rest" first secure data structures encrypted and stored by the network operation system 56 in the physical network device 88, without authorized access via a prescribed API 80. The network operating system 56 also prevents any executable resource in the physical network device 88 (or a user of the physical network device 88) from accessing any unencrypted form of any "in-flight" second secure data structures encrypted and stored by the network operation system 56, without authorized access via a prescribed API 80. The network operating system 56 also prevents any executable resource in the physical network device 88 (or a user of the physical network device 88) from accessing the secure peer-to-peer data network, without authorized access via a prescribed API 80 required by the network operating system 56.

Hence, the network operating system 56 establishes a "closed" access system that requires authorized access via one or more of the APIs 80.

As illustrated in FIG. 3, the example implementation 54 also can optionally include a multi-hop transport layer 60 that enables the secure data network 5 to be deployed overlying an existing network infrastructure, for example the Internet or another multi-hop data network (96 of FIG. 5), for example a private network provided by a wireless 5G service provider (e.g., Verizon, AT&T, etc.), or a private network constructed according to an alternative multi-hop protocol such as the Routing Protocol for Low Power and Lossy Networks (RPL) according to the Internet Engineering Task Force (IETF) Request for Comments (RFC) 6550. Hence, the secure data network 5 can be deployed as a private network (e.g., by a 5G service provider or a RPL-based network) for use by private subscribers, without any data traffic exposed to the Internet. The secure data network 5 also can be deployed, however, from the "ground up" based on an aggregation of multiple trusted P2P connections using the secure P2P network transport 74 across multiple physical network devices establishing a mesh of peer to peer connections via the pairwise topology 98 of replicator devices 16, resulting in the potential deployment of a worldwide deployment of a secure data network 5, without the Internet.

The security policy enforcement 78 provides an enforcement of application-level and user level "manners and semantics" that ensures compliance with digital rights and user relationship rights in the secure private core network 10. In one example, if an errant application (or user) attempted to modify content it did not have rights to (e.g., a user in the federation "F2" 34 attempted to modify content in a message ID 38 generated by the user of the federation "F1" 34 as identified by the federation ID "F1" 18 in the message ID 38), the security policy enforcement 78 can block the attempt to modify the content. As apparent from this example, the security policy enforcement 78 can prevent unauthorized manipulation of media content that has resulted in a proliferation of "deep fake" videos.

The security policy enforcement 78 also provides an enforcement of user digital rights, where at any time a user in the federation "F1" 34 can amend or delete instantaneously any one content item owned by the user (i.e., that includes the corresponding federation ID "F1" as part of its message ID 38): the security policy enforcement 78 can cause all autonomic synchronizers 52 that have a cohort relationship with the federation "F1" to instantly amend or delete the content item identified by its message ID 38.

The security policy enforcement 78 also can enforce various trust levels between an identified cohort, for example a progression from a transient trust (based on location proximity or common interests) to a permanent trust relationship; the security policy enforcement 78 also can enforce a revoked trust ("outcasting"), where the security policy enforcement 78 can respond to a user of the federation "F1" 34 wishing to revoke a relationship with the user of the federation "F2" 34; in this case, the security policy enforcement 78 can provide various warnings regarding revoking a relationship ("outcasting"), including loss of shared data, loss of shared contacts, etc.; as such, the security policy enforcement 78 can encourage dispute resolution between two parties to encourage that societal contracts are fulfilled.

The security policy enforcement 78 also can enforce proper semantic behaviors in the secure private core network 10, including ensuring API calls (by the APIs 80) are presented in the appropriate sequence (i.e., not out-of-order), and that a user of a federation 34 performs social-based operations in the secure private core network 10 in the appropriate order, e.g., a user cannot "join" a conversation without having been invited to join the conversation, and a user cannot "leave" a conversation without first being joined as a member, etc.

Hence, the example implementation 54 can ensure reliable establishment of cohorts, and can enforce security policies that ensure preservation of media rights and maintaining mutual trust between users via their federations 34.

A fundamental problem in the Internet is that prior to deployment of Dynamic Host Configuration Protocol (DHCP), IP addresses at first were allocated (in prescribed address ranges or "blocks") to organizations, and specific IP addresses could be fixed to a specific location (e.g., an office); hence, an Internet Protocol (IP) address had been used to identify a business, a business location (e.g., office location), a person (e.g., an individual utilizing an office having a network connection), and/or a physical network device (e.g., a personal computer operated by the person within the office and utilizing the network connection). However, the use of DHCP, NAT/PAT, wireless access on a guest network, etc., demonstrates than an IP address does not, in fact, accurately represent any one of a business, a location, a person, or a physical network device.

Another fundamental problem in the Internet is that it is built from its Border Gateway Protocol (BGP) core outward to BGP peers that operate as respective Autonomous Systems (ASs), to establish a BGP mesh network, each AS subdividing out from there toward a network edge; hence, a network is not considered "converged" until any one IP address (source address) can route a data packet to any other destination IP address. In addition to causing scaling problems as more networks and more devices are added to the Internet, this universal reachability from any source IP address to any destination IP address also introduces severe security threats since any "threat device" originating at a "source" IP address can threaten any "target device" at a "destination" IP address. In other words, anyone can obtain unrestricted access to the Internet via a threat device using a "source" IP address, and target devices at destination IP addresses need to expend significant resources to prevent intrusion by the threat device.

These security threats are magnified by orders of magnitude by cloud computing services using data centers worldwide for replication of data for cloud-based services: a successful attack on any one of the millions of IP addresses in use by a cloud computing service has the potential to disrupt the entire worldwide cloud computing service for millions of customers of the cloud computing service. Attempts to implement a "zero trust network" (e.g., at a utility company, a gas pipeline company, etc.) in order to avoid a cyber-attack are ultimately ineffective because a "threat device" still has Internet-based access to numerous entry points within the "zero trust network", which can be in the range of millions of IP addresses that the zero trust network relies on for cloud-based services: in other words, a zero trust network utilizing cloud-based services can have an attack surface area of over one million IP address.

The secure private core network 10 is implemented with the following security features and operations: the secure private core network 10 can provide full privacy for each endpoint device 12; the secure private core network 10 can ensure free association of users or their associated endpoint devices 12 (i.e., no third party can force a disassociation or disconnection between two associated users that have formed an association between each other); the secure private core network 10 can enable the protection of ownership of all content by users (i.e., user content cannot be "stolen" by another user); and the secure private core network 10 can eliminate the necessity for centralized services, controls, costs, such as found in a cloud-based computing system. The secure private core network 10 also can prevent unauthorized monetization of users' data, and also can facilitate integrated money exchange.

The secure private core network 10 is implemented as a hybrid peer-to-peer overlay network that does not contain any centralized controls as found in a cloud-based computing system; to the contrary, the secure private core network 10 can be composed based on aggregating a large number of small, decentralized, networks that are built by endpoint devices 12 at the "edge" of the network. Moreover, the secure private core network 10 can inherently implement security as a core policy (i.e., a "base tenant" of the secure private core network 10), where each decentralized network has a limited number of network nodes, and every user must "opt-in" before communicating with another network node.

Hence, the secure private core network 10 can initiate a two-device secure data network 5 between two endpoint devices 12 (e.g., between two individuals sharing data between two smart phones via a P2P link), and can aggregate additional devices 12 for eventual formation of a worldwide secure data network.

The secure private core network 10 comprises a single MCP device 14 that is implemented by a physical network device (e.g., an endpoint device 12) such as a user device, or a high-end computing device (e.g., a server device owned by a private network provider such as a 5G service provider, etc.) executing the executable application resource "MCP" 58 illustrated in FIG. 3; in other words, the MCP device 14 can be deployed as an executable application layer resource 58 that can be executed on any physical network device. In one example, a user device (e.g., a 5G smart phone) can initiate execution of the application resource "MCP" 58 (overlying the 5G smart phone execution of the secure private core network operations 56 as a "network operating system" app) for establishment of the secure data network 5 as a private peer-to-peer network in an isolated region that has a limited number of users (e.g., around twenty users in an isolated region that has no connection to a 5G service provider network or wide area network).

The MCP device 14 operates as a prescribed management agent in the secure peer-to-peer data network 5. Hence, only one MCP device 14 is executed in the secure data network 5 at a given time, even though an isolated secure data network 5 can have its own MCP device 14: hence, a physical network device must halt execution of its MCP device 14 prior to joining another secure data network 5 (e.g., executing a merge operation with a larger, pre-existing secure private core network 10 hosted by a 5G service provider). The MCP device 14 can manage subscriptions and registrations by individuals or businesses to the secure data network 5, accounting, load balancing (executed by the load balancer 62), endpoint-replicator assignment (including tracking endpoint-replicator connections for replicator queries), and software update compatibility enforcement. The MCP device 14 also can coordinate with AI-based assist operations provided for example by the AI-based security service 64 (e.g., connection assist using the navigator service 70, salutation assist, conversation assist using the community server 30, revocation assist, zeroization assist, etc.).

The MCP device 14 is connected to each and every replicator device 16, and can maintain a mapping of every endpoint device 12 to a state (either offline or connected to an identified replicator device 16).

The replicator device 16 can be deployed as an executable application layer resource 58 that can be executed on any physical network device. Each replicator device 16 can establish a secure two-way trusted relationship with the MCP device 14 using a prescribed secure salutation protocol that includes negotiation of a public key pair; each replicator device 16 also can establish a secure two-way trusted relationship with all other available replicator devices 16 (using a prescribed secure salutation protocol that includes negotiation of a public key pair) to form a pairwise topology 98 (i.e., one logical hop between each replicator); each replicator device 16 can provide connections between endpoint devices 12 using various secure network transport operations, including crypto-signed switching described below. Hence, each endpoint device 12 can be connected to another endpoint device by zero logical hops (pure peer-to-peer (P2P) connection "A-A1" in FIG. 1), one logical hybrid P2P hop (e.g., "B-R100-C"), or two-logical hybrid P2P hops (e.g., "A-R1-R100-B"). Each logical connection is based on a first party trusted relationship established by a replicator (e.g., replicator device "R1" 16) and its peer replicator (e.g., replicator device "R100" 16). Replicator devices 16 each include a flow table (forwarding information base) for forwarding received packets after packet authentication.

The directory server 28 can be executed by MCP device 14. The directory server 28 is configured for managing ontologies of data structures (e.g., caching intermediate results), storing tags, federation IDs etc. (for projections, e.g., parallel searches by the distributed search (DS) agent 82 of one or more physical network devices such as endpoint devices 12).

The community server 30 can be executed by the MCP device 14 and/or any endpoint device 12; the community server 30 is configured for hosting posts within a public and/or private community in the secure private core network 10.

The guardian service 66 can be executed as part of the secure network services 76 and can manage protection of data during transmission or reception ("in-flight") and while stored on a machine-readable non-transitory storage medium ("at rest"), including maintaining persistence of endpoint objects 22, conversation objects 42, and message objects 36 according to the associated lifecycle policy "L" 24 and distribution policy "D" 26.

The navigator service 70 can be executed as part of the secure network services 76 and can manage connectivity graphs for how to connect cohorts; the navigator service 70 also can warn the sentinel service 68 of detected threats, and the navigator service 70 can respond to threats detected by the sentinel service 68.

The sentinel service 68 can be executed as part of the secure network services 76 and can detect threats in real time, mitigate against detected threats (e.g., warning user, automatic mitigation operations, etc., notifying the navigator service 70), etc.

The guardian service (i.e., guardian security agent) 66, sentinel service (i.e., sentinel security agent) 68, and navigator service (i.e., navigator security agent) 70 executed as part of the AI-based security service 64 in the secure network services 76 are scalable in that every physical network device can execute the various services 66, 68, and 70 at a scale corresponding to the associated application operations 58 of the physical device executing the associated application layer resources 58; hence, executable agents 66, 68, and 70 operating in one endpoint device (e.g., "A" 12) can securely communicate and share metadata (e.g., feature data such as cyber-attack feature data, wireless network feature data, etc.) with agents operating in other physical network devices (e.g., "R1", "R100", the MCP device 14, endpoint device "B" 12) to localize and identify potential threats and prevent any attacks within the secure private core network 10. Hence, the AI-based security service 64 can manage user metadata in order to enhance user security, as opposed to monitoring user metadata for monetizing.

The distributed search (DS) agent 82 can execute projections: in relational algebra a projection refers to a subset of columns of information; hence, a distributed search (DS) agent 82 can apply a subset of information from a data structure (e.g., a federation ID 18, endpoint ID 20, message ID 38, conversation identifier 44, endpoint object 22, message object 36, conversation object 42 or a hypercontent component thereof), to decompose a mapping of a database lookup into a set of queries and subqueries; the generation of a projection enables execution of parallel distributed searches. A projection can be created by a distributed search (DS) agent 82 executed by any physical network device within the secure data network 5. A projection generated by a distributed search (DS) agent 82 can have a defined scope (or "extent"), for example, local, within a federation 34, within a conversation, global, etc.; a projection also can have different types (e.g., one-time, until a deadline, etc.), and can be named with arbitrary names (e.g., contact lookup, signet scan, etc.). Each projection defines an arbitrary number of "projection entries" that are used to match fields using various search techniques, and to select which fields associated with the matches should be returned; the fields can be arbitrary types of information in the secure data network 5 (e.g., signet, endpoint ID 20, email address, tag, message ID 38, conversation identifier 44, titles, names, hypercontent, URLs, etc.), and the values for matches can be exact matches or regular expressions ("regex") comprising a sequence of characters that have a matching pattern. Each projection entry can select a number of fields that should be returned when matches select information: if no matches are found for a projection entry then no record is returned; for matches, values for the fields selected are returned along with the associated projection entry tag.

Hence, a distributed search (DS) agent 82 can execute a projection that has a scope that limits the extent of a search: the scope can be limited at different locations: for example a scope can limit a search by an endpoint device 12 to a common word usage, old passwords, etc.; a scope can limit a search by a replicator device 16 to GIF image searches, for example; a scope can limit a search by the MCP device 14 to limited fields to preserve privacy of users of the endpoint devices 12, for example limiting searches to a hash of a user email (and not the actual email which is not made available to the MCP device 14), federation ID 18, endpoint ID 20; a scope also can limit a search by the directory server 28 and/or the community server 30. Projections can be executed once, continuously, periodically, until a prescribed "event" deadline (e.g., time expiration, project deadline reached, etc.).

A distributed search (DS) agent 82 also can obtain metadata from other agents executed in the secure private core network 10 to extract feature graphs for assistance in AI-based decisions such as recommendations whether to accept connection requests or conversation requests, keyboard word suggestions, etc.

Hence, the implementation of the secure private core network 10 as a cloudless hybrid peer-to-peer overlay network enables every person and every device to be securely connected, and as such is a realization of "Metcalf's Law" that the value of a telecommunications network is proportional to the square of the number of connected users of the system. The implementation of the secure private core network 10 as a cloudless hybrid peer-to-peer overlay network can extend security features and security operations that mimic social networks without technical constraints, and the use of AI enables the secure private core network 10 to fit policy and interaction requirements of individual users (i.e., people), as opposed to requiring people to adapt to technical constraints.

Hence, the aggregation of two-way trusted relationships in the secure private core network 10 ensures that any attack surface area within the secure data network 5 is limited to two devices at any time, requiring any "threat device" to successfully hack the secure keys of the two peer devices before being able to compromise only the pairwise-encrypted content shared only between the two peer devices; hence, any further attack would require the threat device to successfully hack a next pair of secure keys, etc.

The secure private core network 10 also can include a sensor network comprising one or more sensor devices (e.g., Internet of Things-based sensor devices): each sensor device has a trusted relationship with at least another sensor device, or a trusted relationship with another entity that enables the sensor device to associate with a single individual, a PAN, a room area network, etc.

Depending on implementation, the secure data network 5 can be established as an aggregation of decentralized secure networks. Each decentralized network can be connected to another decentralized network by one or more private dedicated optical fiber connections ("dark fiber pairs") that are part of a private backbone network: the private backbone network can utilize one or more optical network carriers on diverse fiber paths in order to provide a regionally redundant connectivity over large geographic areas (e.g., providing connectivity between eastern United States, southwest United States, Midwest United States, etc.). Sub-oceanic fiber paths and/or satellite communications also can be used to extend the private backbone network in one geographic region to a worldwide private backbone network. The private backbone network also can be managed by a "bare metal infrastructure" where any server devices executing any network-based operations are single-tenant server devices, i.e., the server devices are reserved for the exclusive use of the private backbone network only, with no use by a third-party tenant permitted (as opposed to existing cloud computing systems that can "share tenants" on a single network device). Further, all data in the private backbone network is always encrypted by default, regardless of whether the data is stored on a non-transitory machine-readable storage medium (i.e., "at rest"), or whether the data is undergoing wired or wireless transmission (i.e., "in transit").

Hardware Device Overview

Figure 4:
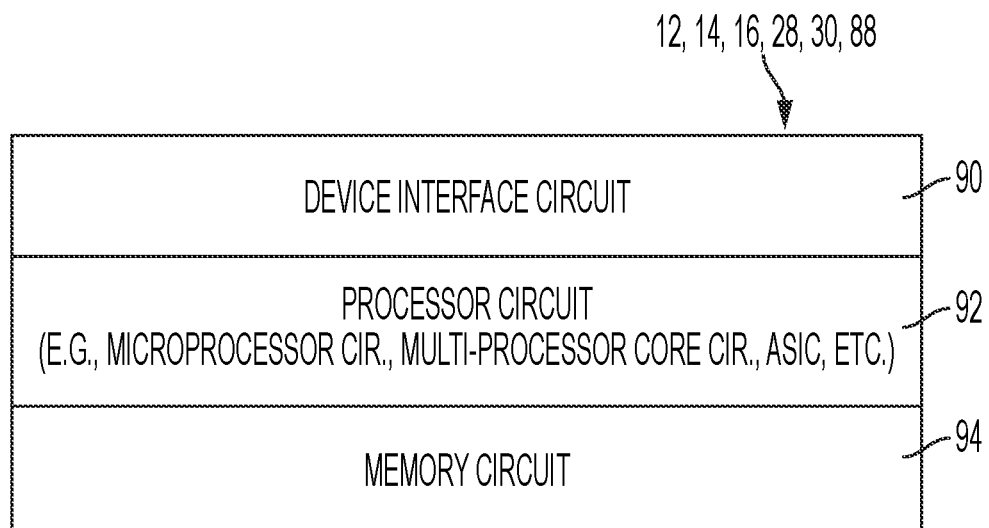
FIG. 4 illustrates an example implementation of any of the network devices described with reference to any of the Figures, according to an example embodiment.

FIG. 4 illustrates an example implementation of any one of the physical network devices shown in any of the other Figures (e.g., 12, 14, 16, 28, 30, and or 88 of FIGS. 1, 2, and/or 6), according to an example embodiment.

Each apparatus (e.g., 12, 14, 16, 28, 30, and or 88 of FIGS. 1, 2, and/or 6) can include a device interface circuit 90, a processor circuit 92, and a memory circuit 94. The device interface circuit 90 can include one or more distinct physical layer transceivers for communication with any one of the other devices (e.g., 12, 14, 16, 28, 30, and or 88); the device interface circuit 90 also can include an IEEE based Ethernet transceiver for communications with the devices of FIG. 1 via any type of data link (e.g., a wired or wireless link, an optical link, etc.). The processor circuit 92 can be configured for executing any of the operations described herein, and the memory circuit 94 can be configured for storing any data or data packets as described herein.

Any of the disclosed circuits of the devices (e.g., 12, 14, 16, 28, 30, and or 88) (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Identity Management System Forming Two-Way Trusted Relationships

The example embodiments enable the secure establishment of universally-unique identities in a secure peer-to-peer data network 5 that is established based on an aggregation of two-way trusted relationships, all under the control of the AI based security suite 64. The secure establishment of universally-unique identities is based on establishing a unique federation identifier for a "requesting party" (e.g., user, business entity, etc.) once a two-way trusted relationship has been established between the requesting party and the secure peer-to-peer data network, and establishing a permanent and unique endpoint identifier for a network device used by the requesting party for joining the secure peer-to-peer data network. The endpoint identifier is associated with the federation identifier to establish that the requesting party has ownership of the corresponding network device, where the "ownership" establishes a two-way trusted relationship between the requesting party and the corresponding network device based on the requesting party retaining possession and control of the network device; hence, the endpoint identifier (associated with the federation identifier) can uniquely identify the network device in the secure peer-to-peer data network as an "endpoint device" that is associated with the requesting party based on a two-way trusted relationship between the requesting party and the endpoint device.

The requesting party can add additional network devices as distinct endpoint devices that are associated with the federation identifier based on a corresponding two-way trusted relationship between the requesting party and the corresponding network device, under the control of the AI based security suite. Hence, a requesting user can aggregate a "federation" of trusted endpoint devices for use within the secure peer-to-peer data network.

Moreover, each endpoint device can uniquely and securely identify itself based on the AI based security suite cryptographically generating a secure private key and a corresponding secure public key associated with the requesting party utilizing the endpoint device. Hence, data storage in each and every network device in the secure peer-to-peer data network, as well as all network communications between each and every network device, can be secured by the guardian security agent based on sharing secure public keys between endpoint devices having established a two-way trusted relationship based on a secure verification of membership within the same "federation" according to a prescribed secure salutation protocol under the control of the AI based security suite.

The following description summarizes the establishment of the secure peer-to-peer data network 5 as a trusted aggregation of two-way first-party trusted relationships, also referred to as "cohorts". Each two-way first-party trusted relationship requires a requesting party "X" to send a relationship request directly to a recipient party "Y" (the first "way" of the two-way first-party trusted relationship), i.e., no "requesting agent" can act on behalf of the requesting party "X" without explicit authorization from the requesting party "X" to send the request; similarly, no "receiving agent" can act on behalf of a recipient party "Y" without explicit authorization from the recipient party "Y". The relationship request can include a secure public key "Key_X" associated with the requesting party "X" (i.e., the requesting party "X" owns a private key "prvKey_X" corresponding to the secure public key "KeyX"), as opposed to relying on any trust in a secure certificate issued by a third party certifying authority. The recipient party "Y" can decide to accept the request or deny the request; if the recipient party "Y" decides to accept the relationship request, the recipient party "Y" can store the secure public key "Key_X" and send to the requesting party "X" an acknowledgment that contains the secure public key "Key_Y" of the recipient party "Y" (i.e., the recipient party "Y" owns a private key "prvKey_Y" corresponding to the secure public key "Key_Y"). The acknowledgment can be encrypted using a temporal key generated by the recipient party "Y": the recipient party can encrypt the temporal key using the secure public key "Key_X", and add to the encrypted acknowledgment (containing the secure public key "Key_Y") the encrypted temporal key. Encryption can be executed, for example, using data encryption standard (DES), TripleDES, RSA, Advanced Encryption Standard (AES), ECIES, etc.

Hence, the requesting party "X", in response to receiving the encrypted acknowledgment containing the encrypted temporal key, can recover the temporal key based on decryption using the corresponding private key "prvKey_X", and decrypt the encrypted acknowledgment using the recovered temporal key to obtain the secure public key "Key_Y". Hence, the two-way first-party trusted relationship between the parties "X" and "Y", or "cohort" between "X" and "Y", can be securely maintained based on the secure storage of data ("at rest") using the key pairs "Key_X" and "Key_Y"; secure communications between the endpoint devices 12 associated with the cohort "X" and "Y" also can be secured based on encrypting each data packet prior to transmission using a temporal key, where the temporal key also is encrypted (using the key of the destination device) to form an encrypted temporal key that is supplied with the encrypted data packet for decryption at the destination.

The aggregation of cohorts between two endpoint devices 12 (pairs of pairs of pairs) ensures that the attack surface area in the secure data network 5 is no more than two ("2")

devices, regardless of the size of the secure data network 5. Use of encrypted temporal keys ensures that every transmitted data packet has a different key needed for decryption following transmission. Every data structure stored in the secure data network 5 has a different encryption with a different key, such that the "prize" for hacking a stored data file is only the one hacked data file.

Figure 5:
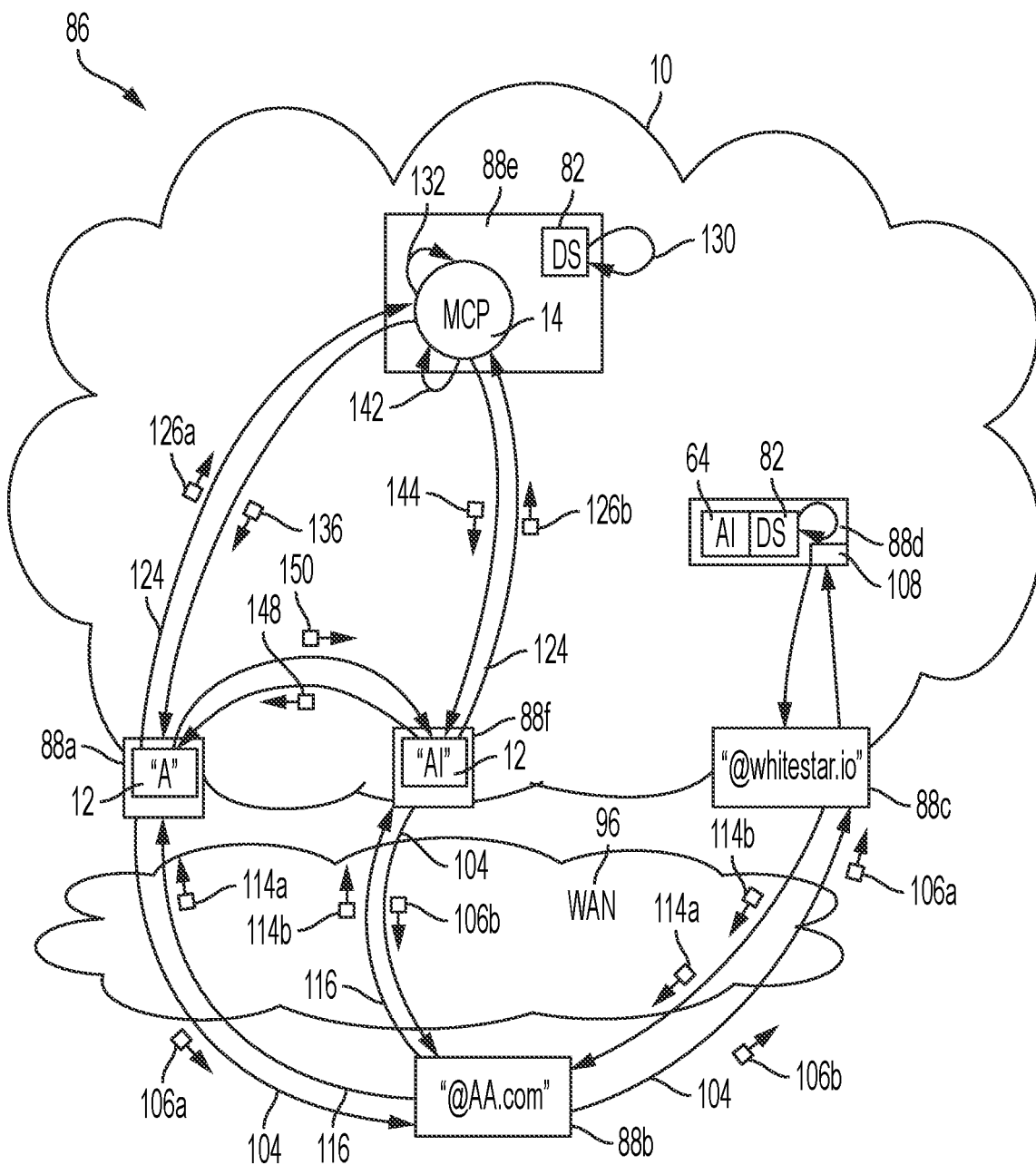
FIG. 5 illustrates in further detail interactions between user-controlled network devices, server network devices in an external data network, and one or more server network devices in the secure peer-to-peer data network, in establishing a two-way trusted relationship for creation of a federation identifier in the secure peer-to-peer data network for the requesting user and an endpoint identifier associated with the federation identifier for each endpoint device of the requesting user, according to an example embodiment.

FIG. 5 illustrates an example identity management system 86 that can be implemented in the secure private core network 10 for secure establishment of trusted relationships in the secure data network 5, according to an example embodiment. A new subscriber "P1" can operate his or her physical network device (88*a* of FIG. 5) to cause the processor circuit 92 of the physical network device 88*a* to download and install, for example via an external data network 96 distinct from the secure peer-to-peer data network 5, an executable application (e.g., an "app") that includes a desired application (e.g., a messenger application 72 of FIG. 3) and the network operating system (NOS) 56. The new subscriber "P1" as a "requesting party" can enter via the device interface circuit 90 of the physical network device 88*a* a command that causes the processor circuit 92 to start ("instantiate") the executable application executing the secure private core network operations 56 on the physical network device 88*a* as an endpoint device "A" 12, causing an account management service executed in the secure network services 76 to prompt the new subscriber "P1" to register by entering an external network address such as a valid email address of the new subscriber "P1" (e.g., "P1 @AA.com"), a mobile number used to receive text-based or image-based messages, etc., where the external network address is used by the requesting party "P1" for reachability via an external data network 96 distinct from the secure peer-to-peer data network 5.

In response to the secure network services 76 (executed by the processor circuit 92 in the physical network device 88*a*) receiving the request by the user "P1" to register the physical network device 88*a* as an endpoint device "A" 12, including the external network address (e.g., "P1@AA.com") of the user "P1", the processor circuit 92 of the physical network device 88*a* executing the account management service in the secure network services 76 on the endpoint device "A" 12 can respond to the external network address entry (e.g., email address) by causing the secure network services 76 to generate a unique private key "prvKeyP1_A" and a public key "KeyP1_A" for the requesting party "P1" on the new endpoint device "A" 12. The account management service executed in the secure network services 76 by the processor circuit 92 on the endpoint device "A" 12 can generate and send a registration request (containing the secure public key "KeyP1_A" and the external network address (e.g., email address "P1@AA.com")) 106*a* to a prescribed destination 108 associated with the secure private core network 10 (e.g., a destination email address "registerme@whitestar.io" owned by the secure private core network 10) that is reachable outside the secure private core network 10 via the external data network 96 (e.g., the Internet, a 5G carrier, etc.). Hence, the device interface circuit 90 of the physical network device 88*a* can output, via the external data network 96, the registration request 106*a* received from the processor circuit 92 executing the NOS 56 for transmission, via the external data network 96, to a physical network device 88*b* hosting a messaging service (e.g., email server "@AA.com") for the subscriber "P1"; the messaging server 88*b* can forward the message 106*a*, via the external data network 96, to a physical network device 88*c* hosting a messaging service (e.g., email server "@whitestar.io") associated with the secure private core network 10 of the secure peer-to-peer data network 5.

The prescribed destination 108 of the registration request 106*a* can be hosted by the same physical network device 88*c* receiving the registration request 106*a* from the transmitting messaging server 88*b* or a different physical network device (e.g., 88*d*) in the secure private core network 10 (e.g., within a replicator device 16). The physical network device (e.g., 88*c* or 88*d*) hosting the prescribed destination 108 can cause its processor circuit 92 to execute a distributed search (DS) agent 82 in order to execute fraud control using the AI-based security service 64, including determining whether the external network address (e.g., email address "P1 @AA.com") specified in the registration request 106*a* has been previously been used for any registration in the secure private core network 10, whether the external network address has been previously outcasted or "banned" by another subscriber or any AI-based security service 64 as owned by an untrusted party, etc.; the distributed search (DS) agent 82 (executed in the physical network device 88*c* or 88*d*) having received the registration request 106*a* can limit the scope in the availability of the external network address to prevent the MCP device 14 from obtaining any external network address (e.g., email address) "in the clear", for example based on limiting any validation of email addresses to only hashes of email addresses, described below.

In response to detecting that the external network address (e.g., email address) in the registration request is a new external network address and does not appear to be fraudulent, the distributed search (DS) agent 82 (executed in the physical network device 88*c* or 88*d*) that executed the fraud control can validate that the external network address can be trusted: in response, the distributed search (DS) agent 82 can cause the secure private core network 10 to generate and send a validation response (e.g., email message, text message, etc.) 114*a* to the external network address of the new subscriber "P1" (e.g., email "P1@AA.com" hosted by the physical network device 88*b*) via the external data network 96, where the validation message 114*a* can include the secure public key "KeyP1_A" generated by the secure network services 82 on the new device "A" 12: the secure public key "KeyP1_A" supplied in the registration request can be expressed in the validation message 114*a* in different forms, for example a QR code, a URL, or a text string.

Hence, the new subscriber "P1" can utilize the physical network device 88*a* (or another physical network device 88, as appropriate) to retrieve the validation response from the messaging server 88*b* "out of band" (i.e., outside the secure private core network 10): the validation response 114*a* specifies instructions enabling the new subscriber "P1" to submit the secure public key "KeyP1_A" for validation by the secure network services 82 executed on the new device "A" 12, for example in the form of a machine readable QR code, a URL link, or a machine-readable text string.

In response to the secure network services 82 executed on the new device "A" 12 (by the processor circuit 92 of the physical network device 88*a*) verifying the secure public key "KeyP1_A" in the validation response 114*a* sent to the to the external network address of the new subscriber "P1" (e.g., "P1@AA.com"), the secure network services 82 can verify the identity of the new subscriber "P1" using the new device "A" 12 as a legitimate owner of the external network address (e.g., "P1 @AA.com") that has been determined as trusted through the above-described fraud control testing. The secure network services 82 executed on the new device "A" 12 also can respond to verifying the secure public key "KeyP1_A" by registering the physical network device 88a as the endpoint device "A" 12 based on auto-generating (crypto-generating) a verified identity in the form of a federation ID "F1" 18 that is allocated to the email address "P1 @AA.com" used by the subscriber "P1", thereby establishing a relationship between the trusted email address "P1@AA.com" and the endpoint device "A" 12. The network operating system 56 executed in the endpoint device "A" 12 (within the physical network device 88a) executes registration also based on prompting the new subscriber "P1" to create a new password for entry into the secure data network 5, and by auto-generating (crypto-generating) an endpoint ID 20 for the endpoint device "A" 12 that is a 128 bit UUID (e.g., "EID_A"; "E1" in FIG. 2). The creation of a new password by the network operating system 56 ensures that the requesting party "P1" retains exclusive "ownership" (i.e., possession and control) of the endpoint device "A" 12, and thus establishes a two-way trusted relationship between the requesting party "P1" and the corresponding network device "A" based on the requesting party retaining possession and control of the network device.

If the physical network device 88a is to be shared with a second user (e.g., "P3"), then the network operating system 56 can establish a second "profile" for the second user "P3", enabling the second user "P3" to register via the identity management system as described herein for creation of a different federation ID (e.g., "F6") 18 and a different endpoint ID (e.g., "E6") 20 for the same physical network device; in this case, the endpoint object 22 specifying the endpoint ID (e.g., "E6") 20 for the physical device used by the second user "P3" can include a reference indicating the physical network device is shared separately by two federations (e.g., "F1" and "F6"); as apparent from the foregoing, there is no sharing between the two federations sharing the same physical network device unless a two-way trusted relationship is established between the two federations (e.g., "F1" and "F6") according to the prescribed secure salutation protocol.

Hence, the network operating system 56 executed in the endpoint device "A" 12 (by the processor circuit 92 of the physical network device 88a) can store in the memory circuit 94 of the endpoint device "A" 12 a federation object 32 that comprises the federation ID 18 and the endpoint object 22 having an endpoint ID "E1" 20 that uniquely identifies the endpoint device "A" 12 in the secure private core network 10. The federation object 32 stored in the endpoint device "A" 12 identifies the federation "F1" 34 within the secure private core network 10.

The network operating system 56 executed in the endpoint device "A" 12 also can generate a cryptographic nonreversible hash of the external network address (e.g., email address "P1 @AA.com"), for example "HASH[P1 @AA.com]", that is considered in the secure private core network 10 an acceptable identifier for the federation 34 that is also identified by the federation ID "F1". The nonreversible hash of the external network address guarantees anonymity of the user "P1" while maintaining absolute identity control; hence, an email address of an existing federation 34 can be protected against subsequent registration requests based on utilizing the nonreversible hash of the email address.

The network operating system 56 executed in the endpoint device "A" 12 can identify the MCP device 14 as a prescribed management agent in the secure peer-to-peer data network 5, establish a connection with the MCP device 14 (e.g., via an IP address that is made available to the network operating system executed in the endpoint device "A" 12), and generate and supply a registration message 126a comprising its cryptographic nonreversible hash (e.g., its hashed email address "HASH[P1@AA.com]"), its federation ID "F1" 18, and its endpoint ID "EID_A" that is owned by the federation ID "F1" (e.g., "HASH[P1@AA.com]->F1" and "F1->['EID_A']") (the network operating system 56 executed in the endpoint device "A" 12 also can include its public key "KeyP1_A"). The registration message also can include one or more network addresses (e.g., IP addresses) used by the endpoint device "A" 12 for communications via a data network 96 as a multi-hop transport layer (60 of FIG. 3) underlying the secure peer-to-peer data network 5. The registration message also can specify an "alias" used by the endpoint device "A" 12 as a reference for identifying a keypair (e.g., "KeypairPl_A"), where the network operating system 56 executed in the endpoint device "A" 12 can generate multiple private/public key pairs having respective aliases, for example different cohorts, different data flows, etc.

The processor circuit 92 of the physical network device 88e executing the MCP device 14 can respond to receiving the registration message 126a by causing its distributed search (DS) agent (82 of FIG. 1) to execute a projection search on the supplied identifiers "HASH[P1 @AA.com]", "F1" 18 and/or "EID_A" 20 to determine if there are any matches. For example, the distributed search (DS) agent 82 can execute a projected search of the cryptographic nonreversible hash "HASH[P1 @AA.com]" to determine if there is a match indicating the cryptographic nonreversible hash (generated using the same external network address) has already been used for an existing federation identifier 18 that is already registered in the secure peer-to-peer data network 5.

In response to the distributed search (DS) agent 82 finding no other matches, the MCP device 14 can register the new federation 34. Hence, the registration message 126a enables the MCP device 14, as the prescribed management agent for the secure data network 5, to associate the federation ID "F1" 18 as owning the cryptographic hash "HASH[P1@AA.com]" and the endpoint identifier "EID_A" 20; the registration message 126a further enables the MCP device 14 to associate the secure public key "KeyP1_A" with the endpoint identifier "EID_A" 20 owned by the federation ID "F1" 18. As described below, the registration message enables the MCP device 14 to generate and store a data structure, referred to as a "signet", that comprises the secure public key "KeyP1_A" of the endpoint device "A" 12, the "alias" used by the endpoint device "A" 12, a list of one or more network addresses (e.g., IP addresses) usable by the endpoint device "A" 12 for communications via an underlying data network 96 used as a multi-hop transport layer 60, and the endpoint ID "EID_A" 20 of the endpoint device "A" 12.

The MCP device 14, in response to determining there are no matches on the supplied identifiers "HASH[P1@AA.com]", "F1" 18 and/or "EID_A" 20 (indicating an absence of any previous use of the cryptographic nonreversible hash), can acknowledge the registration message based on generating and sending to the endpoint device "A" 12 a secure registration acknowledgment 136 indicating that there are no other endpoints, and can include a public key "Key_MCP" of the MCP device 14; the MCP device 14 can encrypt the public key "Key_MCP" with a temporal key (resulting in the encrypted data structure "ENC(Key_MCP)"), encrypt the temporal key with the secure public key "KeyP1_A" of the endpoint device "A"

12, and supply the encrypted temporal key "ENC(TK)" in the secure registration acknowledgment 136 with the encrypted data structure "ENC(Key_MCP)" to the endpoint device "A" 12. The supplied identifiers "HASH [P1@AA.com]", "F1" and "EID_A" also can be supplied by the MCP device 14 to the directory server 28 for subsequent projection searches in the secure private core network 10.

The network operating system 56 of the endpoint device "A" 12 can receive the secure registration acknowledgment 136 containing a first encrypted portion ("ENC(TK)") and a second encrypted portion "ENC(Key_MCP)". The supply of the encrypted temporal key "ENC(TK)" with the encrypted acknowledgment "ENC(Key_MCP)" in the secure registration acknowledgment 136 enables the network operating system 56 executed in the endpoint device "A" 12 to decrypt the temporal key "TK" using its private key "prvKeyP1_A", decrypt the acknowledgment using the decrypted temporal key "TK", and obtain the secure public key "Key_MCP" of the MCP device 14. Hence, the sharing of secure public keys between the endpoint device "A" 12 and the MCP device 14 establishes a two-way trusted relationship between the endpoint device "A" 12 and the MCP device 14 in the secure private core network.

Hence, at this stage the federation object 32 contains only the endpoint object 22 having an endpoint ID "E1" 20 that uniquely identifies the endpoint device "A" 12 used for initial registration with the secure private core network 10.

The same user "P1" can register a physical network device 88f as a new device "A1" 12 based on installing and instantiating the network operating system 56 on the physical network device 88f, and entering the same external network address (e.g., email address "P1 @AA.com") of the subscriber "P1" in response to a prompt by the account management service executed in the secure network services 76 of the network operating system 56; the account management service executed in the secure network services 76 on the physical network device 88f can respond to reception of the external network address (e.g., email address "P1@AA.com") by causing the secure network services 76 to generate a unique private key "prvKeyP1_A1" and a public key "KeyP1_A1" for the user "P1" on the new device "A1" 12, and generate and send the registration request (containing the secure public key "KeyP1_A1") 106b to the prescribed destination (e.g., "registerme@whitestar.io") 108 associated with the secure peer-to-peer data network 5.

As described previously, receipt of the registration request 106b causes a physical network device (e.g., 88c or 88d) executing the distributed search (DS) agent 82 in the secure per-to-peer data network 5 to execute fraud control, for example based on determining an inordinate number of registration requests 106. The distributed search (DS) agent 82, having received the registration request, can limit the scope of searching the external network address (e.g., the email address) to prevent the MCP device 14 from obtaining the external network address "in the clear", and can generate and send a validation response 114b to the external network address (e.g., email address "P1@AA.com") of the subscriber "P1", where the validation response can include the secure public key "KeyP1_A1" generated by the secure network services 82 on the new device "A1" 12.

The subscriber "P1" can receive the validation response 114b that specifies instructions (e.g., QR code, URL, text string, etc.) for submitting the included secure public key "KeyP1_A1" for validation. In response to the secure network services 82 executed on the new device "A1" 12 verifying the secure public key "KeyP1_A1" in the validation response 114b, the secure network services 82 executed on the new device "A1" 12 can (temporarily) auto-generate a federation ID "FA1" 18 that is allocated to the external network address (e.g., email address "P1@AA.com") used by the subscriber "P1", establishing a secure relationship between the external network address (e.g., email address "P1@AA.com") and the endpoint device "A1" 12. The network operating system 56 executed in the endpoint device "A1" 12 also can respond to verifying the secure public key "KeyP1_A1" in the validation response 114b by prompting the subscriber "P1" to create a new password for entry into the secure data network 5 via the new device "A1" 12, and by auto-generating (crypto-generating) an endpoint ID 20 for the endpoint device "A1" 12 that is a 128 bit UUID (e.g., "E2" in FIG. 2).

Hence, the network operating system 56 executed in the endpoint device "A1" 12 can store in the memory circuit 94 of the endpoint device "A1" 12 the federation object 32 that comprises the endpoint object 22 specifying the federation ID "FA1" 18 and having an endpoint ID (e.g., "EID_A1") 20 that uniquely identifies the endpoint device "A1" 12 in the secure private core network 10. The federation object 32 stored in the endpoint device "A1" 12 identifies the federation ID "FA1" 18 within the secure private core network 10.

The network operating system 56 executed in the endpoint device "A1" 12 also can generate a cryptographic nonreversible hash of the external network address (e.g., the email address "P1@AA.com"), e.g., "HASH[P1@AA.com]", connect to the MCP device 14 (e.g., via an IP address that is made available to the network operating system executed in the endpoint device "A1" 12), and supply a registration message 126b.

The registration message 126b generated by the endpoint device "A1" 12 can specify the cryptographic nonreversible hash "HASH[P1 @AA.com]", its federation ID "FA1" 18, and its endpoint ID "EID_A1" that is owned by the federation ID "FA1" (e.g., "HASH[P1@AA.com]→FA1" and "FA1→['EID_A1']") (the network operating system 56 executed in the endpoint device "A" 12 also can include its public key "KeyP1_A1"). The network operating system 56 executed in the endpoint device "A1" 12 also can add to the registration message 126b one or more network addresses used for communications via an underlying data network 96 used as a multi-hop transport layer (60 of FIG. 3).

The MCP device 14 can respond to reception of the registration message from the endpoint device "A1" 12 by causing its distributed search (DS) agent 82 to execute a projection search on the supplied identifiers "HASH [P1@AA.com]", "FA1" and/or "EID_A1".

In response to determining a match on the cryptographic nonreversible hash "HASH[P1 @AA.com]", the distributed search (DS) agent 82 can cause the MCP device 14 to generate and output to the endpoint device "A1" 12 a secure endpoint acknowledgment 144 indicating another endpoint device "A" 12 exists in its federation 34; the acknowledgment generated also can include the signet of the endpoint device "A" 12 that is already a member of the same federation 34. The signet of the endpoint device "A" 12 can include: the secure public key "KeyP1_A" of the endpoint device "A" 12, an "alias" used by the endpoint device "A" 12, reachability information such as a list of one or more IP addresses usable by the endpoint device "A" 12, and the endpoint ID 20 of the endpoint device "A" 12.

As described previously, the MCP device 14 can encrypt the endpoint acknowledgment (containing the signet of the endpoint device "A" 12 and the secure public key "Key_MCP") with a temporal key, encrypt the temporal key with the secure public key "KeyP1_A1" of the endpoint device "A1" 12, and supply the encrypted temporal key in the secure endpoint acknowledgment 144 to the endpoint device "A1" 12. The supplied identifiers "HASH [P1@AA.com]", "F1" and "EID_A1" also can be supplied to the directory server 28 for subsequent projection searches in the secure private core network 10.

The encrypted temporal key in the secure endpoint acknowledgment 144 received by the endpoint device "A1" 12 enables the guardian security agent 66 in the network operating system 56 executed in the endpoint device "A1" 12 to decrypt the temporal key, decrypt the acknowledgment, and obtain the secure public key "Key_MCP" of the MCP device 14.

The guardian security agent 66 in the network operating system 56 executed in the endpoint device "A1" 12 can respond to the decrypted acknowledgment (specifying another endpoint is a member of the same federation 34, and that contains the signet for the endpoint device "A" 12) by initiating a prescribed secure salutation protocol with the endpoint device "A" 12. In particular, the secure network service 76 executed in the endpoint device "A1" 12 can generate and send, based on the received signet, a secure salutation request 148 identifying its endpoint ID "EID_A1" 20 and requesting a relationship with the endpoint device "A" 12; the salutation request can be encrypted using the secure public key "KeyP1_A" of the endpoint device "A" 12, and can include the alias (associated with the secure public key "KeyP1_A"), and also can include the secure public key "KeyP1_A1" of the endpoint device "A1" 12.

The endpoint device "A" 12 can "automatically" respond back with the endpoint device "A1" 12, for example the network operating system 56 executed in the endpoint device "A1" 12 can infer that the endpoint device "A" 12 and the endpoint device "A1" 12 are in the same federation based on a determined match of the hashed external network addresses (e.g., email addresses: for example, a search by a distributed search (DS) agent 82 on a hash of the email address can return the endpoint IDs for both the endpoint device "A" 12 and the endpoint device "A1" 12.

Hence, the network operating system 56 executed in the endpoint device "A" 12 can respond to the salutation request by sending a secure salutation reply (e.g., a salutation acceptance) 150 that includes the endpoint object 22 of the endpoint device "A" 12: the salutation reply 150 can be encrypted as described above using a temporal key that is further encrypted using the secure public key "KeyP1_A1", for formation of a secure salutation reply (e.g., secure salutation acceptance).

Hence, the network operating system 56 executed in the endpoint device "A1" 12 can determine from the endpoint object 22 of the endpoint device "A" 12 specified in the secure salutation reply 150 received that the endpoint object 22 specifies a federation ID "F1" 18: the federation ID "F1" 18 in the endpoint object 22 in the salutation acceptance 150 causes the network operating system 56 in the endpoint device "A1" 12 to determine that the endpoint device "A" 12 pre-existed in the secure private core network 10; hence, the network operating system 56 in the endpoint device "A1" 12 can establish a two-way trusted relationship with the endpoint device "A" 12 based on exchange of the public keys "KeyP1_A" and "KeyP1_A1", and in response re-associate its federation ID from "FA1" to "F1" in its endpoint object 20, and discard the initial federation ID "FA1". Consequently, the network operating system 56 in the endpoint device "A1" 12 adopts the federation ID "F1" 18, thus establishing the identity of the owner of the devices "A" and "A1" as federation "F1" 34. Hence, the endpoint device "A1" 12 in its corresponding endpoint object 22 adopts the identity, user name, user image, etc. of the same user as in the endpoint device "A" 12 (as identified by its corresponding endpoint ID 20).

Hence, the secure private core network 10 can establish that the federation "F1" 32 owns the endpoint devices "A" and "A1" 12; moreover, a cohort is established between the endpoint devices "A" and "A1" 12 based on sharing cryptographic keys, such that any content created on one endpoint (e.g., endpoint device "A" 12) can be autonomically and securely replicated to the other endpoint (e.g., endpoint device "A1" 12) by the autonomic synchronizer 52. Since the synchronization process in the secure private core network 10 is aware of all the federations 34, any connection by an existing endpoint device 12 in a federation 34 to a new endpoint device 12 or a new federation 34 can cause autonomic replication of the connection to the other devices in the existing federation 34 or the new federation 34 by the associated autonomic synchronizer 52.

According to example embodiments, an identity management system ensures establishment of two-way trusted relationships in a secure peer-to-peer data network based on ensuring each identity is verifiable and secure, including each federation identity that creates a verified association with an identified external network address used by a requesting party, and each endpoint identifier that is cryptographically generated and associated with a federation identity, enabling a federation identity to own numerous endpoint identifiers for aggregation of two-way trusted relationships in the secure peer-to-peer data network. Additional details regarding the identity management system are disclosed in commonly-assigned, copending application Ser. No. 17/343,268, filed Jun. 9, 2021, entitled "IDENTITY MANAGEMENT SYSTEM ESTABLISHING TWO-WAY TRUSTED RELATIONSHIPS IN A SECURE PEER-TO-PEER DATA NETWORK", the disclosure of which is incorporated in its entirety herein by reference.

Distributed Crypto-Signed Switching in a Secure Peer-to-Peer Network

The secure storage and transmission of data structures can be extended between different "federations" of network devices, including endpoint devices (established by different users having established respective two-way trusted relationships with the secure peer-to-peer data network), and replicator devices, according to the prescribed secure salutation protocol under the control of the AI based security suite 64. Hence, crypto-signed switching can be enabled between two-way trusted network devices in a secure peer-to-peer data network, according to the prescribed secure salutation protocol under the control of the AI based security suite. Additional security-based operations can be deployed in a scalable manner in the secure peer-to-peer data network, based on the distributed execution of the AI-based security suite 64.

The guardian security agent 66 can secure (i.e., encrypt) all "at-rest" data structures as first secure data structures for secure storage in the network device, for example based on encrypting each "at-rest" data structure with a corresponding private key: for example, the guardian security agent 66 executed in the endpoint device "A" 12 can secure the "at-rest" data structures using the private key "prvKeyP1_A" that can be dynamically generated by the guardian security agent 66 during initialization of the network operating system 56. The guardian security agent 66 (executed, for example, by the endpoint device "A" 12) also can secure "in-flight" data structures as second secure data structures based on dynamically generating a temporal key "TK", and encrypting the temporal key 68 with a public key (e.g., "Key_B") of a destination device (e.g., the endpoint (device "B" 12, ensuring secure communications in the secure peer-to-peer data network 5. Additional details regarding encrypting "at rest" data structures and "in-flight" data structures are described below, and are also disclosed in the above-incorporated U.S. Publication No. 2021/0028940.

In particular, the guardian security agent 66 of a source network device (e.g., an endpoint device "A" 12) can encrypt an "in-flight" data packet into a secure data packet based on dynamically generating a unique temporal key (e.g., "TK") used for encrypting a data packet payload into an encrypted payload, and encrypting the unique temporal key into an encrypted temporal key (e.g., "ENC(Key_B) [TK]") using a secure public key (e.g., "Key_B") of a destination device (e.g., endpoint device "B" 12) identified within a destination address field (e.g., "DEST=B"). In other words, the guardian security agent 66 of the source endpoint device dynamically generates a new temporal (e.g., time-based) key "TK" for each secure data packet to be transmitted, ensuring no temporal key is ever reused; moreover, the encrypted temporal key ensures that only the destination device can decrypt the encrypted temporal key to recover the temporal key used to encrypt the payload.

The guardian security agent 66 of a source network device (e.g., an endpoint device "A" 12) also can digitally sign the packet (containing the encrypted payload and encrypted temporal key) using the endpoint device A's private key "prvKeyP1_A" to generate a source endpoint signature. Hence, the guardian security agent 66 can generate the secure data packet for secure "in-flight" communications in the secure peer-to-peer data network 5.

Figure 6:
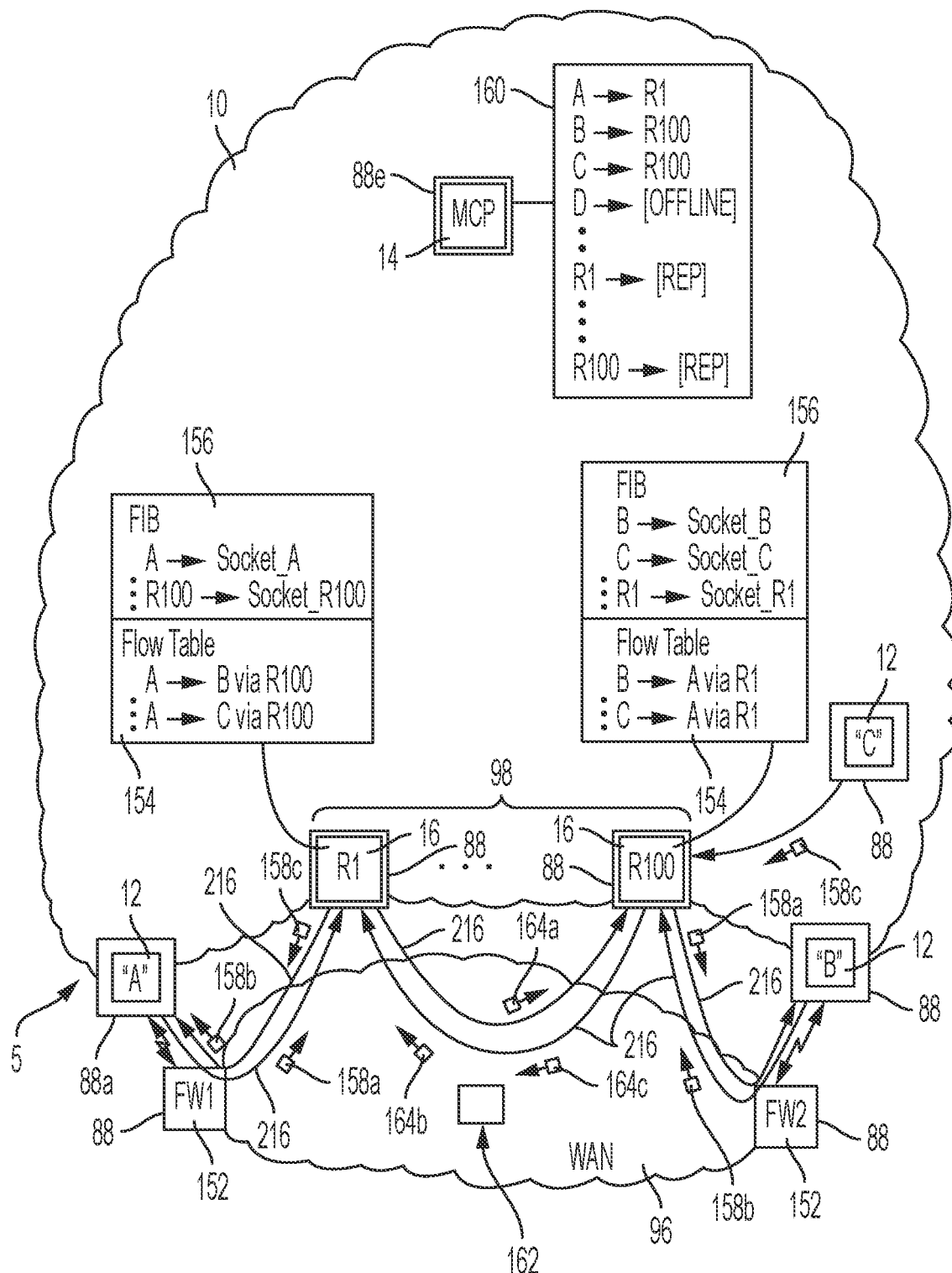
FIG. 6 illustrates crypto-signed switching between two-way trusted network devices in a secure peer-to-peer data network, according to an example embodiment.

The source endpoint signature generated by the guardian security agent 66 in the source network device (e.g., the endpoint device "A" 12) enables the guardian security agent 66 of a receiving network device (e.g., the replicator device "R1" 16, and/or the endpoint device "B" 12 of FIG. 6) in possession of the public key "KeyP1_A" to validate that the secure data packet is from the endpoint device "A" 12. The guardian security agent 66 of the receiving network device also can validate an incoming secure data packet based on determining that the receiving network device (e.g., the replicator device "R1" 16, and/or the endpoint device "B" 12 of FIG. 6) has a two-way trusted relationship with the source network device as described above, where the source network device can be identified by the source address field "SRC=A".

Hence, the guardian security agent 66 of a receiving network device (e.g., the replicator device "R1" 16 or the endpoint device "B" 12 in FIG. 6) can validate an identity for a received secure data packet 158, based on validating a source endpoint signature using the corresponding public key (e.g., "KeyP1_A") of the source network device (e.g., the endpoint device "A" 12), and based on the guardian security agent 66 of the receiving network device determining that it has a two-way trusted relationship with the source network device identified in the source address field.

The guardian security agent 66 of each of the replicator devices "R1" and "R100" 16 also can enforce crypto-signed switching based on validation of a replicator signature. In particular, following validation of the secure data packet 158, the guardian security agent 66 of the replicator device (e.g., "R1") 16 can cryptographically sign the secure data packet, using its private key "prvKey_R1" to generate a replicator signature for secure transmission to its trusted peer replicator device "R100" 16 as a secure forwarded packet (e.g., 164*a*) containing the secure data packet (e.g., 158*a*) and the replicator signature, ensuring no network node 162 in the underlying external data network 96 can decrypt the secure data packet (e.g., 158*a*) contained in the secure forwarded packet (e.g., 164*a*).

Similarly, the guardian security agent 66 of a replicator device (e.g., "R100") 16 can determine that the cryptographically-signed secure forwarded packet (e.g., 164*a* of FIG. 6) is received from a trusted peer replicator device (e.g., "R1") 16, and can execute validation of the secure forwarded packet (e.g., 164*a*) based on verifying the replicator signature in the secure forwarded packet using the public key "Key_R1" of the replicator device "R1" 16. As described below, the guardian security agent 66 and/or the sentinel security agent 68 of the replicator device (e.g., "R100") can verify the secure forwarded packet is not a replay attack. The replicator device (e.g., "R100") can respond to successful validation of the secure forwarded packet (containing the secure data packet 158*a*) by forwarding the secure data packet (e.g., 158*a*) to its attached destination endpoint device (e.g., "B") 12, maintaining the cryptographic security of the secure data packet (e.g., 158*a*) for decryption by the attached destination endpoint device "B" 12 following validation of the secure data packet (e.g., 158*a*) by the guardian security agent 66 in the destination endpoint device "B" 12.

Hence, the guardian security agent 66 can validate identities for establishment and enforcement of all two-way trusted relationships, including during execution of the prescribed secure salutation protocol as described previously.

The secure network services 76 executed in each physical network device 88 also includes a sentinel service 68. The sentinel service 68 is implemented in each physical network device 88 as executable code (e.g., an executable "agent") within the secure network services 76; hence, the sentinel service 68 also can be referred to herein as a sentinel agent 68.

The navigator security agent 70 of an endpoint device (e.g., the endpoint device "A" 12) can enable secure communications to be established through a firewall (e.g., "FW1" 152 of FIG. 6) of a locally-utilized wireless data network, based on establishing a two-way trusted relationship with a replicator device (e.g., "R1" 16) in the secure peer-to-peer data network 5, for example according to the prescribed secure salutation protocol. As illustrated in FIG. 6, the "mesh" 98 of interconnected replicator devices 16 enables the replicator device "R1" 16 to provide reachability to the destination network device "B" via a second replicator device "R100" 16.

In particular, the crypto-signed switching described herein is based on the MCP device 14, as the prescribed management agent in the secure peer-to-peer data network 5, tracking a connection status 160 of every network device in the secure peer-to-peer data network 5, including each endpoint device 12 and each replicator device 16. The MCP device 14 establishes a pairwise topology (e.g., a mesh) 98 of two-way trusted replicator devices 16 based on causing the guardian security agent 66 of each replicator device 16, during registration with the MCP device 16, to execute a prescribed secure salutation protocol with each and every other replicator device 16 in the secure private core network 10. The MCP device 14 also causes the guardian security agent 66 of each endpoint device 12, during registration with the MCP device 16 (or in response to the endpoint device 12 returning from an "offline state" to an "online" state), to establish a two-way trusted relationship with an identified replicator device (selected by the MCP device 16) based on executing a prescribed secure salutation protocol with the identified replicator device 16; hence, the navigator security agent 70 executed in the endpoint device "A" 12 can create an entry specifying that a replicator device is reachable via an identified wireless data link between the endpoint device "A" 12 and the firewall device "FW1" 152.

The MCP device 14 also can identify, for a requesting replicator device (e.g., "R1") 16, a peer trusted replicator device (e.g., "R100") 16 for reaching a destination endpoint device (e.g., "B"), even if the secure peer-to-peer data network 5 utilizes the external data network 96 where each endpoint device 12 can be physically located in a wireless local area network that is secured by a security appliance (e.g., a firewall device) 152, and replicator devices 16 forward secure forwarded packets 164 via the external data network 96.

The example embodiments also are particularly effective in cases where actual deployment is via an existing IP network infrastructure 96, for example where the endpoint device "A" is connected within a first private (e.g., "home 1") IP network secured by a first firewall device "FW1" 152, and the second endpoint device "B" is connected within a second private (e.g., "home 2") IP network secured by a second firewall device "FW2" 152. The navigator security agents 70 of the endpoint devices "A" and "B" can dynamically establish a secure virtualized peer-to-peer connection, using crypto-switching via the pairwise topology 98 in the secure private core network 10, in a manner that maintains security and trust and while maintaining secrecy of the data traffic as it traverses through the secure private core network 10 via the underlying external data network 96; in other words, the crypto-switching via the pairwise topology 98 ensures that no core component (e.g., replicator device 16 or the MCP device 14) is capable of detecting the contents of the any data traffic transmitted by endpoint devices "A" or "B".

The replicator devices "R1" and "R100" 16 can create a flow table entry 154 that maintains a flow state for reaching a destination endpoint device via an identified trusted peer replicator device 16; each replicator device 16 also can establish a forwarding information base (FIB) entry 156 that enables the replicator device 16 to reach each trusted peer replicator device 16 and each connected endpoint device 12.

Figure 7A:
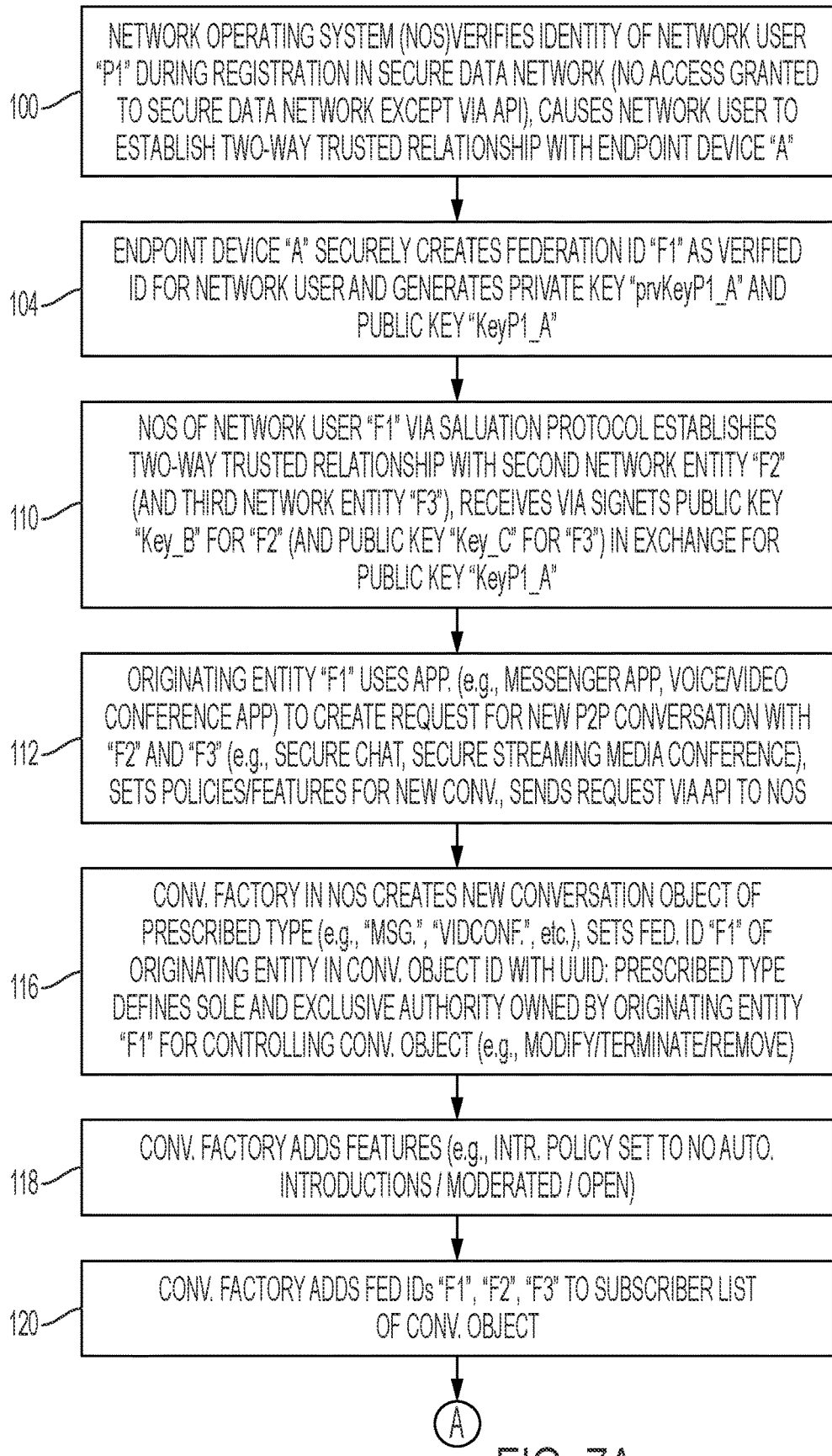
FIGS. 7A-7E summarize a method of executing secure peer-to-peer communication sessions via a network operating system in a secure peer-to-peer data network, according to an example embodiment.
Figure 7B:
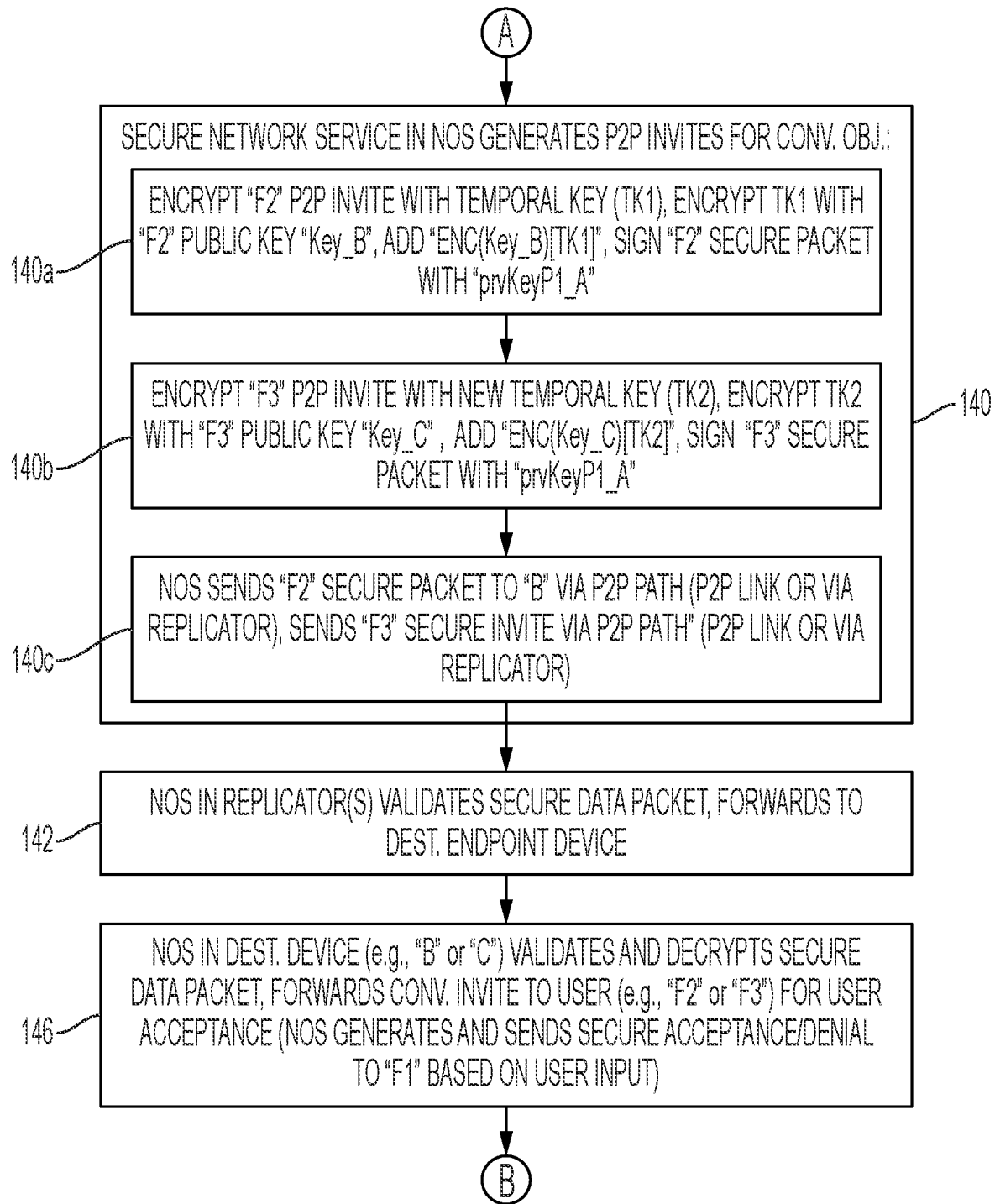
Figure 7C:
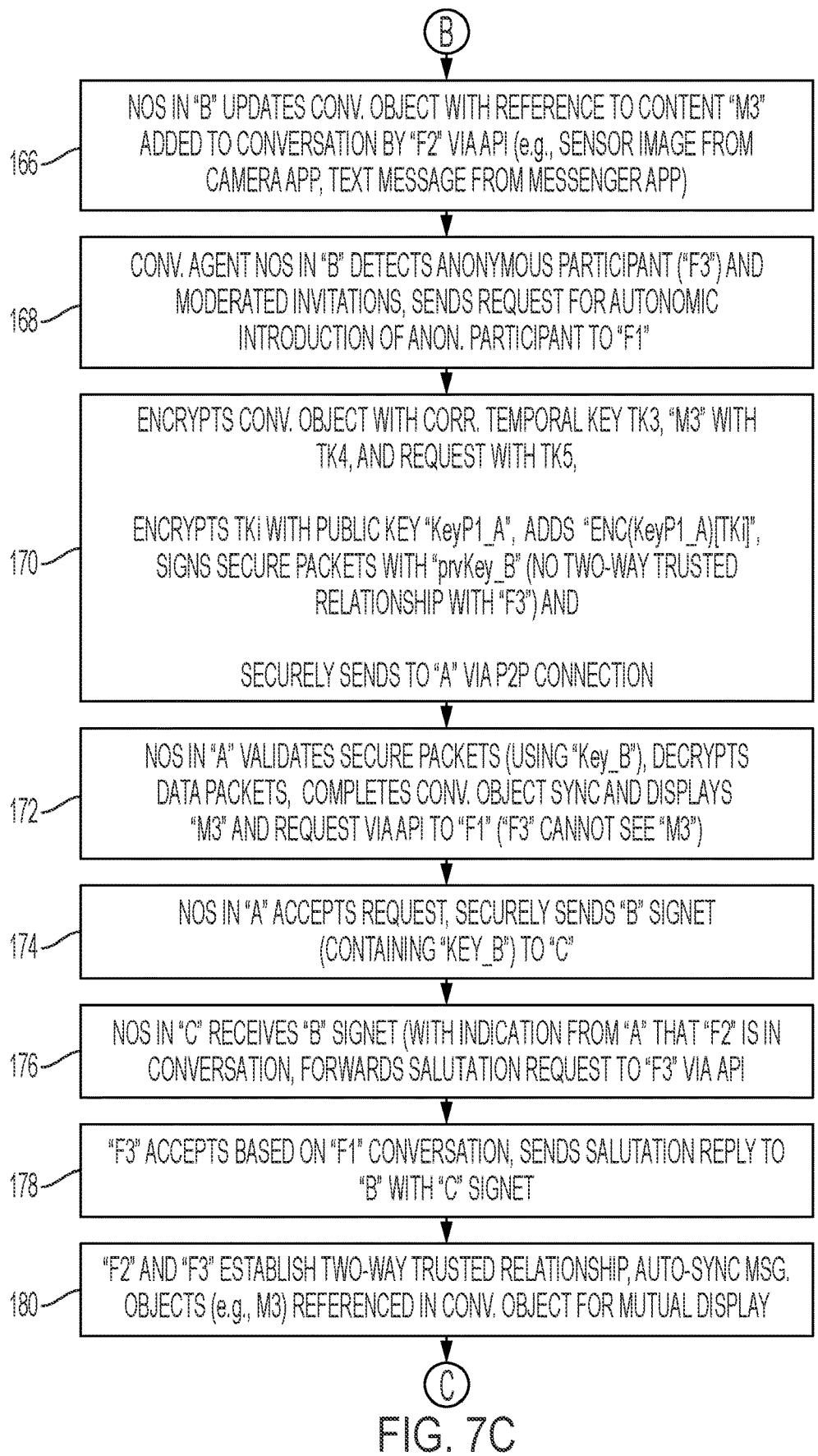
Figure 7D:
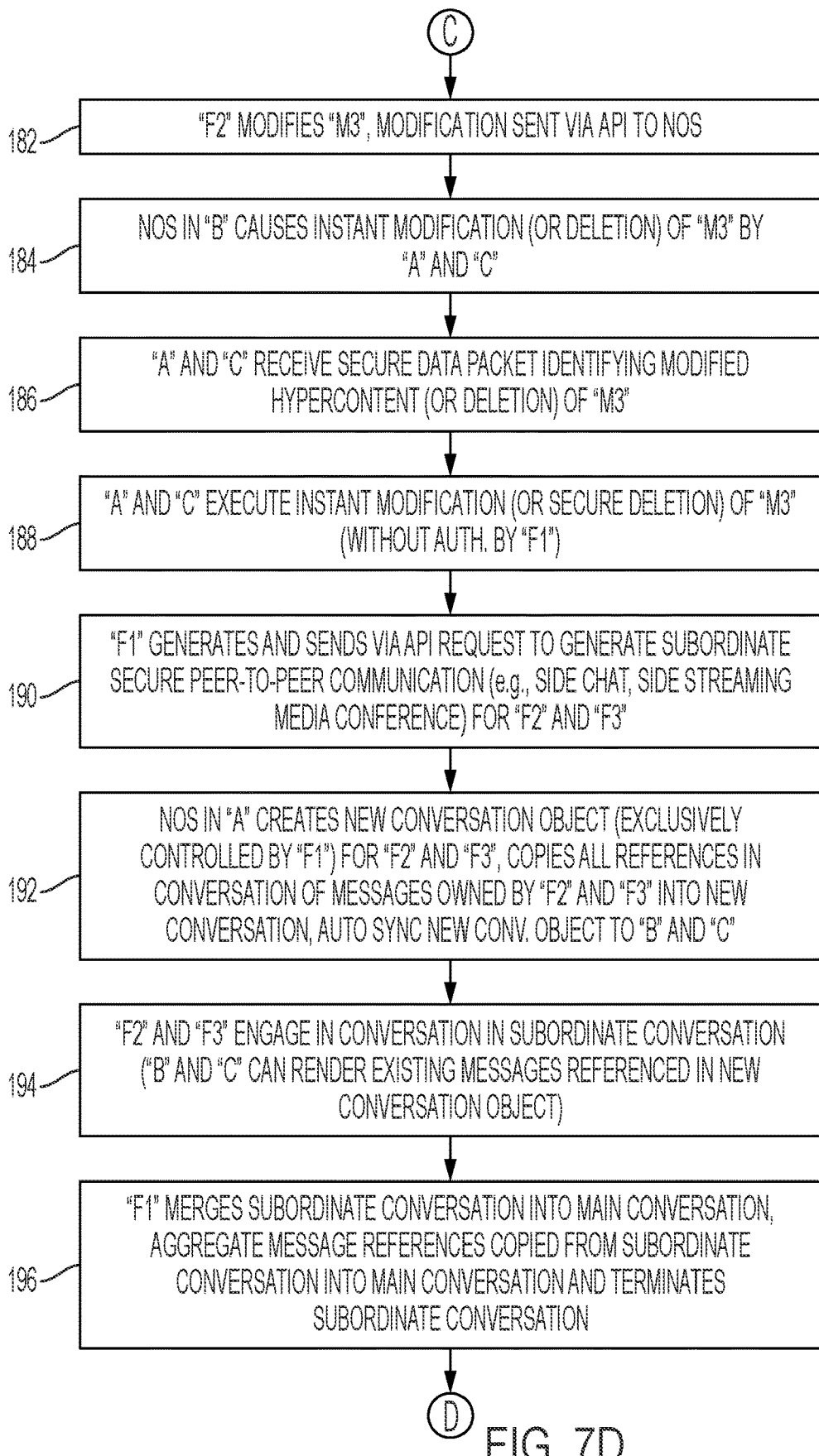
Figure 7E:
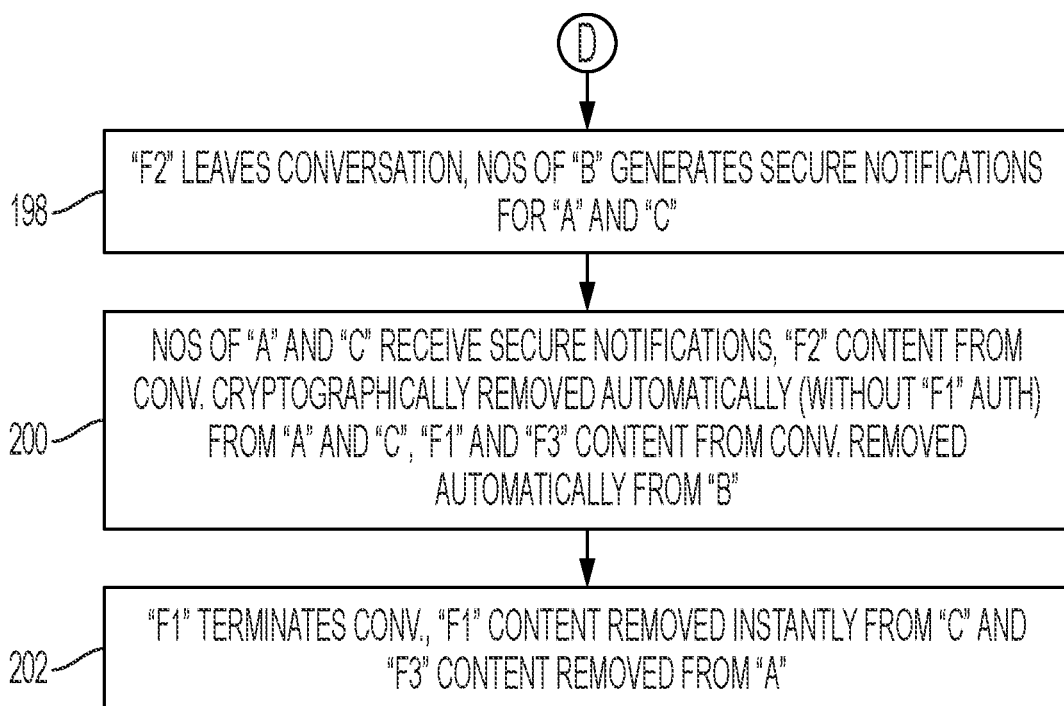
Figure 8:
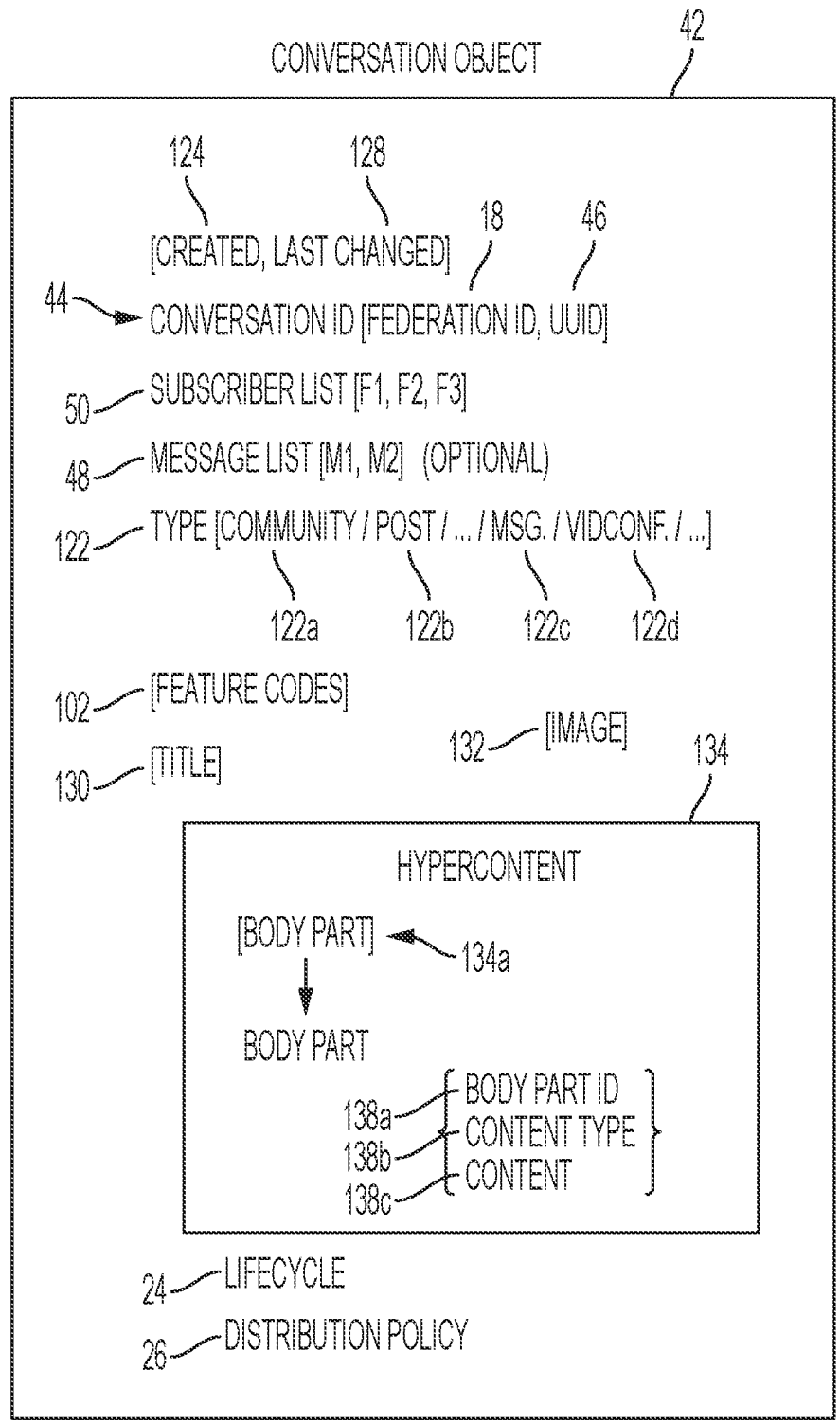
FIG. 8 illustrates a conversation object that is generated for secure peer-to-peer communication sessions via a network operating system in a secure peer-to-peer data network, according to an example embodiment.

Hence, the navigator security agent 70 enables secure communications to reach endpoint devices 12 located "behind" a security appliance 152, since the endpoint device (e.g., "A") 12 can execute the prescribed secure salutation protocol with the identified replicator device 16, causing the associated secure appliance (e.g., "FW1") 152 to create a state entry that identifies the replicator device (e.g., "R1") 16, for example based on the IP address of the replicator device (e.g., "R1") 16 that is specified in the destination address field of a secure data packet (e.g., 158*a* of FIGS. 7 and 8). The state entry created by the security appliance 152 also can be updated in response to the endpoint device "A" 12 sending a secure data packet (e.g., 158*a*) to its replicator device (e.g., "R1") 16; hence, the state entry created by the secure appliance (e.g., "FW1") 152 enables the replicator device (e.g., "R1") 16 to send a second secure data packet (e.g., 158*b*) back to the endpoint device (e.g., "A") 12 via the secure appliance (e.g., "FW1") 152.

The sentinel security agent 68 can detect a replay attack based on executing a prescribed hash on each encrypted temporal key within a received secure data packet 158. In particular, the encrypted temporal key not only ensures that the destination device is the only network device in the secure peer-to-peer data network 5 that can decrypt the encrypted payload: the encrypted temporal key also provides for the secure data packet a cryptographically-unique encrypted bitstring, also referred to herein as a "nonce" (or "nounce"), that enables any physical network device 88 receiving the secure data packet 158 to verify the secure data packet 158 is not a copy of a prior transmitted data packet (indicating a replay attack).

Hence, the sentinel security agent 68 of an endpoint device 12 can respond to receiving a secure data packet 158 (or the sentinel security agent 68 of a replicator device 16 can respond to receiving a secure forwarded data packet 164) by retrieving an encrypted bitstring from the "encrypted temporal key field", and executing its own prescribed hash (e.g., using its own unique hash parameters) to generate a hashed value of at least a portion of the encrypted bitstring (corresponding to the encrypted temporal key). The sentinel security agent 68 can compare the hashed value with other stored hash values (e.g., previously stored in a data structure within its memory circuit 94) to determine whether the hashed value equals a prior instance of a hashed value for a prescribed time interval (e.g., one minute).

It is mathematically impossible for hashes of different encrypted temporal keys to have an identical hash value unless the data packet 158 (or 164) is copied: hence, the sentinel security agent 68 executed by the processor circuit 92 of any physical network device 88 can determine that the secure data packet 158 (or 164) is not a copy based on a determined absence of a prior instance of the prescribed hash, and can continue processing the secure data packet 158, including storing the prescribed hash for future comparisons for subsequently-received secure data packets 158 or 164, for example for a corresponding identified source-destination flow.

Conversely, any sentinel security agent 68 can detect a replay attack in response to determining the prescribed hash from the received secure data packet 158 matches a prior instance of the prescribed hash on a previously-received secure data packet 158, indicating the secure data packet is a copy of a previously-received data packet. Additional details regarding the secure communications in the secure data network 5 are described in commonly-assigned, copending application Ser. No. 17/345,057, filed Jun. 11, 2021, entitled "CRYPTO-SIGNED SWITCHING BETWEEN TWO-WAY TRUSTED NETWORK DEVICES IN A SECURE PEER-TO-PEER DATA NETWORK", the disclosure of which is incorporated in its entirety herein by reference.

Secure Peer-to-Peer Based Communication
Sessions Via Network Operating System

FIGS. 7A-7E summarize a method of executing secure peer-to-peer communication sessions via the network operating system 56 of FIG. 3 in the secure peer-to-peer data network 5, according to an example embodiment.

FIG. 8 illustrates in further detail an example conversation object (42 of FIG. 2) that is generated for secure peer-to-peer communication sessions between network entities (e.g., "F1", "F2", and "F3") 34 of FIGS. 1 and 2 via distributed execution of a network operating system 56 in respective endpoint devices "A", "B", and "C" 12 of FIGS. 1, 2, and 6 in a secure peer-to-peer data network 5, according to an example embodiment. Example secure peer-to-peer communications can include private secure "chat" sessions, private secure email sessions, private secure audioconference or videoconference sessions, etc., that eliminate the use of a hosting server such as a cloud-based hosting server device.

As described previously, prior attempts at implementing security have been ineffective because such security attempts have been implemented at the application layer, thus requiring manual intervention by one or more network users attempting to apply security to an application program (e.g., users required to manually implement PGP in order to attempt secure email communications). Hence, application-layer security have been limited due to the inherent reliance on user knowledge and diligence in implementing and maintaining the application-layer security; moreover, as indicated previously application-layer security can be ignored or bypassed by a malicious user. Attempts by a user to "unsubscribe" from an email message does not guarantee that the originator of the email message will respect the "unsubscribe" request.

In addition, any attempt at implementing security in server-based communications (e.g., hosted by cloud-based server devices) still invariably results in a server device exposing unencrypted forms of the messaging data during execution of hosting operations, resulting in potential exposure of the unencrypted messaging data due to a successful cyberattack on a data center hosting the server device.

In contrast, the network operating system 56 as described above implements all executable services associated with security in the secure data network 5, including encryption of in-flight and at-rest data structures, identity protection, enforcing privatization of user metadata, secure outcasting of bad actors, intrusion prevention, etc. The network operating system 56 retains exclusive control to any access of the secure data network 5, or to any access of any in-flight and at-rest data structures associated with a user interacting with the secure data network 5. Hence, all applications and all "users" (i.e., federation entities 34) can interact in the secure data network 5 with trust and knowledge that all network-based services, user identities, user data, user metadata, etc., are secured in the secure data network 5 by the distributed execution of the network operating system 56.

As described previously with respect to FIG. 3, the application layer 58 in a physical network device 88 can include one or more executable applications overlying the network operating system 56, for example an MCP application 14, a community server application 30, a replicator application 16, a messenger application 72, a video conference application (not shown), etc.; further, each executable application in the application layer 58 can access the secure peer-to-peer data network 5 (or any secure "at-rest" or "in-flight" data structure associated with the secure peer-to-peer data network 5) only via a prescribed API 80 of the network operating system 56. In other words, no user or no physical network device 88 can access the secure data network 5 (or the secure private core network 10) without installation of the network operating system 56 and authorized registration with the identity management system 86 via the network operating system 56. The secure executable container 56 prevents any executable resource in the network device 88 (at the application layer 58) from accessing the secure data network 5, from accessing any unencrypted form of any first secure data structure stored in the network device 88, or from accessing any second secure data structure generated for secure communications in the secure data network 5, without authorized access via a prescribed Application Programming Interface (API) 80 required by the secure executable container 56.

Hence, the execution of the network operating system (i.e., the secure executable container) 56 in each physical network device 88 providing access to the secure data network 5 establishes a distributed execution and enforcement of security operations throughout the secure data network 5. The distributed execution of security operations in the secure data network 5 by the network operating system 56 in each physical network device 88 also enables establishment of a distributed execution of secure peer-to-peer communications via the network operating system 56, without the need for any "cloud-based" communications server.

As described previously with respect to FIG. 5, the network operating system 56 executed in a network device (e.g., 88a) can establish a verified identity 18 of each network user (e.g., "P1") during registration in the secure data network 5, based on verifying in operation 100 the external network address (e.g., email address) used during registration can be trusted as passing fraud control, verifying the network user (e.g., "P1") owns the external address that passed fraud control, and requiring the network user to establish exclusive ownership and control of the network device (e.g., 88a) by entering a password required by the network operating system 56.

As described previously with respect to FIG. 5, the network operating system 56 executed in the network device (e.g., 88a) in operation 104 can establish the verified identity 18 based on cryptographically generating the federation identifier (e.g., "F1") 18. The network operating system 56 executed in the network device (e.g., 88a) also can cryptographically generate an endpoint ID 20 that identifies the endpoint device (e.g., "A") 12 in the secure data network 5. Hence, the federation ID "F1" 18 is securely established in operation 104 by the network operating system 56 executed in the endpoint device "A" 12 as a verified identity of the network user (e.g., "P1") in the secure data network. As described previously, the network operating system 56 executed in the endpoint device "A" 12 in operation 104 also can cryptographically generate a secure private key "prvKeyP1_A" and a corresponding secure public key "KeyP1_A" for the endpoint device "A" 12 within the federation "F1" 34.

Similarly, the network operating system 56 executed in the endpoint device "B" 12 in operations 100 and 104 can securely establish the federation ID "F2" 18 for the user of the endpoint device "B" 12 (and generate corresponding private key "prvKey_B" and public key "Key_B"), and the network operating system 56 executed in the endpoint device "C" 12 in operations 100 and 104 can securely establish the federation ID "F3" 18 for the user of the endpoint device "C" 12 (and generate corresponding private key "prvKey_C" and public key "Key_C").

The network operating system 56 of the endpoint device "A" 12 owned by the federation entity "F1" 34 in operation 110 can execute the prescribed secure salutation protocol described above to establish a two-way trusted relationship with the federation entity "F2" 34, including receiving a corresponding signet for the endpoint device "B" 12 owned by the federation entity "F2" 34 and that includes the public key "Key_B" of the endpoint device "B" 12, in exchange for the federation entity "F2" 34 receiving the corresponding signet for the endpoint device "A" 12 owned by the federation entity "F1" 34 and that includes the public key "KeyP1_A".

The network operating system 56 of the endpoint device "A" 12 owned by the federation entity "F1" 34 in operation 110 also can execute the prescribed secure salutation protocol described above to establish a two-way trusted relationship with the federation entity "F3" 34, including receiving a corresponding signet for the endpoint device "C" 12 owned by the federation entity "F3" 34 and that includes the public key "Key_C" of the endpoint device "C" 12, in exchange for the federation entity "F3" 34 receiving the corresponding signet for the endpoint device "A" 12 owned by the federation entity "F1" 34 and that includes the public key "KeyP1_A".

Hence, the network operating system 56 of the endpoint device "A" 12 can initiate a secure P2P communication with the endpoint device "B" 12 using the keypair "prvKeyP1_A" and "Key_B"; the network operating system 56 of the endpoint device "A" 12 also can initiate a secure P2P communication with the endpoint device "C" 12 using the keypair "prvKeyP1_A" and "Key_C". Similarly, the network operating system 56 of the endpoint device "B" 12 can initiate a secure P2P communication with the endpoint device "A" 12 using the keypair "prvKey_B" and "KeyP1_A", and the network operating system 56 of the endpoint device "C" 12 can initiate a secure P2P communication with the endpoint device "A" 12 using the keypair "prvKey_C" and "KeyP1_A". As apparent from the foregoing, no other network device 88 in the secure data network 5 can decrypt the secure communications because it does not have possession of the transmitter-receiver keypair needed to decrypt the secure data packet.

Following establishment of the federation IDs 18 as verified identifies in operations 100 and 102 and the establishment of two-way trusted relationships with the federations "F2" and "F3" 34 in operation 110, the federation user "F1" 34 in operation 112 can utilize an executable application at the application layer 58 (e.g., a messenger application 72, a voice or video conferencing application, etc.) executed in the endpoint device "A" 12 to create a request for initiation of a new peer-to-peer (P2P) communication with the second network entity "F2" 34 and the third network entity "F3" 34. The new P2P communication can be in the form of a secure P2P communication session such as a secure chat, a secure email thread, a secure media conference, etc.

According to example embodiments, the federation entity "F1" 34, as the originating entity of the new P2P communication, retains sole and exclusive authority to control the secure P2P communication, including creation, modifying, and secure termination of the secure P2P communication, described below. Hence, the federation entity "F1" 34 in operation 112 as the originating entity can add to the request prescribed policies and feature for the secure P2P communication, described below.

Hence, the executable application at the application layer 58 that generated the request for initiating the new secure P2P communication with the network entities "F2" and "F3" 34, according to the policies and features selected by the originating entity "F1", can send in operation 112 the request to the network operating system 56 executed in the endpoint device "A" 12 via a prescribed API 80.

The API 80 in the network operating system 56 executed in the endpoint device "A" 12 can forward the request to the security policy enforcement 78: the security policy enforcement 78 can validate semantics, etc. in the request, including verifying that the originating entity "F1" has established a two-way trusted relationship with the invitees "F2" and "F3" 34 specified in the request. In response to completing validation the security policy enforcement 78 can forward the request to a "conversation factory" executed in the secure network services 76 of the network operating system 56 in the endpoint device "A" 12.

The conversation factory executed in the network operating system 56 of the endpoint device "A" 12 in operation 116 can process the received request by generating a new conversation object 42, illustrated in FIG. 8, that defines the secure P2P communication to be initiated in the secure data network 5.

As described with respect to FIG. 2, each conversation object 42 created by the conversation factory includes a conversation ID 44 (comprising the federation ID 18 of the federation entity 34 that created the conversation object 42) and a UUID 46. Each conversation object 42 also includes a subscriber list 50 of federation entities having subscribed to the conversation object, including at a minimum the federation ID 18 of the conversation object owner (e.g. "F1") that created the conversation object 42.

As illustrated in FIG. 8, the conversation object 42 generated by the conversation factory includes a creation timestamp 124 indicating a time that the data object was created, and a "last change" timestamp (i.e., update timestamp) 128 indicating the last time the data object was updated. The conversation object 42 also comprises a type field 122 that identifies the "type" of the conversation object 42. Example conversation object types 122 can include community 122a, community forum post ("post") 122b, messaging ("msg.") 122c, experience, system notification, load balancer, a secure compartmentalized information folder (SCIF), a real time video conference ("vidconf.") 122d, an arcade, a shared calendar, a secure vault file system (i.e., secure encrypted file system), federated settings, etc.

The conversation object 42 generated in operation 116 by the conversation factory in the secure network services 76 of the network operating system 56 also can include an optional reference (also referred to herein as a "message list") 48 of zero or more message objects 36 associated with the conversation object 42. The conversation object also can include one or more hypercontent fields, for example a title field 130, an image field 132, and a hypercontent portion 134. The hypercontent portion 134 can include one or more body parts 134a, each including a body part ID 138a, a body part content type 138b, and a reference 138c to the body part content (or the actual body part content embedded therein). Hence, the conversation object 42 can be self-describing similar to a message, and the hypercontent 134 in the conversation object can updated dynamically, described below.

As illustrated in FIG. 8, the conversation factory executed in the network operating system 56 of the endpoint device "A" 12 in operation 116 can generate a conversation object 42 of various types 122, for example of type "community" 122a for a new community forum, of type "post" 122b for a new community post conversation, of type "message" 122c for a message-based conversation (e.g., "chat"), of type "videoconf" 122d for a video conference, etc. Hence, the conversation factory in operation 116 can respond to the request by creating the conversation object 42 of a prescribed type (e.g., a secure "chat" according to the "message" type 122c, or a secure videoconference according to the "videoconf" type 112d), that describes the secure P2P communication to be initiated.

Further, the prescribed type 122 that is set in the conversation object 42 in operation 116 defines the attributes of the conversation to be created; hence, the message types 122c and 122d define the creation of a secure peer-to-peer communication (i.e., without any centralized server), where the message types 122c and 122d cause each network operating system 56 to inherently provide the property that the originating entity "F1" retains the sole and exclusive authority to control the secure peer-to-peer communication, including cryptographically secure creation, modification, termination, and removal of the secure peer-to-peer communication from any network device 88 connected to the secure data network 5. Other types can be added for secure P2P email, secure P2P voice calls or voice conferences, etc., controlled solely by the originating entity.

As illustrated in FIG. 8, the conversation factory in operation 116 also adds to the conversation object 42 the conversation identifier 44 comprising the federation ID "F1" 18 of the originating entity "F1" 34 and a UUID 46, enabling any other endpoint device 12 to identify that only the originating entity "F1" identified in the conversation ID 44 has the authority to control the secure P2P communication according to the prescribed policies for the message type 122*c*/122*d*.

The conversation factory executed by the network operating system 56 in the endpoint device "A" 12 in operation 118 also can set feature codes 102 that describe the enforceable policies and features selected by the originating entity "F1" for execution of the secure P2P communication. As described below, example feature codes 102 that can be set in response to the request received in operation 116 can include setting an introduction policy for introducing network entities within the secure P2P communication that do not have a two-way trusted relationship. As described below, the invitees "F2" and "F3" 32 in the secure P2P communication (assuming they each accept the invitation) are identified between each other as "anonymous participants" if they have not yet established between each other a two-way trusted relationship. Hence, the conversation factory executed by the network operating system 56 in the endpoint device "A" 12 can add to the feature codes 102 in the conversation object 42 an introduction policy for one of no autonomic introductions between one or more of the anonymous participants in the secure peer-to-peer communication, moderated autonomic introductions between the anonymous participants, or open autonomic introductions between the anonymous participants.

The originating entity "F1" 32 also can cause the conversation factory executed in the network operating system 56 in the endpoint device "A" 12 in operation 118 to designate within the feature codes 102 guidelines for content types (e.g., the Motion Picture Industry Association (MPIA) ratings such as U, G, PG, PG13, R, NC17), etc. The conversation object 42 also includes a lifecycle policy "L" 24 and a distribution policy "D" 26.

The conversation factory executed in the network operating system 56 in the endpoint device "A" 12 in operation 120 also can add to the conversation object 42 the subscriber list 50 that includes the federation IDs 18 of at least the originating entity "F1" 32 having ownership of the conversation object 42, and the invitees "F2" and "F3" 32. The conversation factory in operation 120 also can add to the subscriber list 50 (or a separate data structure associated with the invitees "F2" and "F3") a "pending acceptance" indicator that identifies that a pending invitation to the invitees "F2" and "F3" has not yet been accepted. Alternately, the conversation factory can defer adding the invitees "F2" and "F3" to the subscriber list 50 until the invitees have accepted a secure invitation to join the secure peer-to-peer conversation defined by the conversation object 42.

A conversation agent executed in the network operating system 56 in the endpoint device "A" 12 also can add one or more star tags or dot tags for attracting other invitees to the secure P2P communication defined by the conversation object 42. Additional details regarding attracting invitees based on a conversation object 42 can be found in commonly-assigned, copending application Ser. No. 17/372,607, filed Jul. 12, 2021, entitled "DIRECTORY SERVER PROVIDING TAG ENFORCEMENT AND NETWORK ENTITY ATTRACTION IN A SECURE PEER-TO-PEER DATA NETWORK", the disclosure of which is incorporated in its entirety herein by reference.

Hence, the conversation factory (executed in the secure network services 76 of the network operating system 56 in the endpoint device "A" 12) in operation 140 can generate a corresponding secure P2P invitation for each invitee, where the secure P2P invitation can include a copy of the conversation object 42 that defines the secure P2P communication. As described previously with respect to FIG. 6, the secure network services 76 executed in the network operating system 56 of the endpoint device "A" 12 in operation 140*a* can secure the P2P invite for secure transmission to the endpoint device "B" 12 owned by the invitee "P2" 34 based on: encrypting the P2P invite payload with a dynamically-generated temporal key "TK1"; encrypting the temporal key "TK1" with the secure public key "Key_B" of the endpoint device "B" 12 owned by the invitee "P2" to generate an encrypted temporal key "ENC(Key_B)[TK1]]"; appending the encrypted temporal key "ENC(Key_B)[TK1]]" to the encrypted payload; and cryptographically signing the secure P2P invite to the invitee "P2" (comprising the encrypted payload and the encrypted temporal key) with the private key "prvKeyP1_A" owned by the network operating system 56 in the endpoint device "A" 12, prior to transmission in operation 140*c* to the endpoint device "B" 12 via a secure peer-to-peer path, for example via a secure P2P data link or via a replicator device 16.

Similarly, the secure network services 76 executed in the network operating system 56 of the endpoint device "A" 12 in operation 140*b* can secure the P2P invite for secure transmission to the endpoint device "C" 12 owned by the invitee "P3" 34 based on: encrypting the P2P invite payload with a dynamically-generated temporal key "TK2"; encrypting the temporal key "TK2" with the secure public key "Key_C" of the endpoint device "C" 12 owned by the invitee "P3" to generate an encrypted temporal key "ENC (Key_C)[TK2]]"; appending the encrypted temporal key "ENC(Key_3)[TK2]]" to the encrypted payload; and cryptographically signing the secure P2P invite to the invitee "P3" (comprising the encrypted payload and the encrypted temporal key) with the private key "prvKeyP1_A" owned by the network operating system 56 in the endpoint device "A" 12, prior to transmission in operation 140*c* to the endpoint device "C" 12 via a secure peer-to-peer path, for example via a secure P2P data link or via a replicator device 16.

As described previously with respect to FIG. 6, the next-hop receiving network device (e.g., a replicator device "R1" 16 or the destination network device if a secure peer-to-peer data link is available) in operation 142 validates the received secure P2P invitation (e.g., 158*a* of FIG. 6) based on verifying the secure P2P invitation is from a two-way trusted transmitting network device (e.g., the replicator device "R1" 16 has a two-trusted relationship with the endpoint device "A" 12), verifying the secure P2P invitation is not a replay attack; and verifying the digital signature using the public key "KeyP1_A". The replicator device "R1" 16 can add its own replicator signature that can be verified by the replicator device "R100" 16 providing a "next-hop" logical connection for the endpoint devices "B" and "C" 16 owned by the respective invitees "F2" and "F3".

As apparent from the foregoing, the secure P2P invitations between the originating entity "F1" 34 and the invitees "F2" and "P3" are sent only via replicator devices 16, with no intervention by any "cloud-based" meeting server, chat server, messaging server, etc.

Hence, the network operating systems 56 in the respective destination endpoint devices "B" and "C" 12 in operation 146 can validate the received secure P2P invitations as described previously, decrypt the secure P2P invitations using the respective private keys "prvKey_B" and "prvKey_C", and forward the decrypted P2P invitation to the invitees "P2" and "P3" via the API 80 to the appropriate messenger app 72, video conferencing app., etc. Additional details regarding the secure communications to the invitees "P2" and "P3" are disclosed in the above-incorporated application Ser. No. 17/345,057.

Hence, an invitee (e.g., "F2" or "F3") can accept or deny the invitation to join the secure P2P communication created by the originating entity "F1", causing the associated application in operation 146 to send the acceptance or denial (via the API 80) to the network operating system 56 executed in the corresponding endpoint device "B" or "C". The network operating system 56 generates and sends the secure acceptance or denial based on encrypting the payload with a corresponding temporal key, encrypting the temporal key (using the public key "KeyP1_A"), signing the secure data packet with the corresponding secure private key "prvKey_B" or "prvKey_C" (as described previously with respect to operation 140), and sending the secure data packet in operation 146 to the endpoint device "A" 12.

The network operating system 56 executed in the endpoint device "A" 12 can respond to receiving the secure acceptance or denial from the endpoint devices "B" and "C" by validating the received secure data packets, decrypting the payloads to recover the decrypted acceptance or denial, and update the conversation object 42 to indicate the invitees "F2" and "F3" have accepted the invitation to join the secure P2P communication (or declined the invitation). Hence, any invitee maintains full rights and authority to decide whether to join a secure communication initiated by another entity, preventing any invitee from being forced to join a secure P2P communication without their consent. The ability of an invitee to decline joining a secure P2P communication can be particularly effective in protecting the invitee from situations in which the invitee may consider communicating with the originating entity "F1" in a more open forum, but where the invitee is concerned in conducting private communications with the originating entity.

In one example, the invitation initiated by the originating entity "F1" and generated by the network operating system 56 in the endpoint device "A" 12 also can include a list of invitees: hence, a particular invitee can identify if any other invitees to the secure P2P communication have a two-way trusted relationship with the particular invitee based on the "name" of the trusted invitees being displayed to the particular invitee (as opposed to an "anonymous" designation for invitees that do not have a two-way trusted relationship with the particular invitee).

Assuming the invitees "F2" and "F3" 34 have accepted the invitation, the originating entity "F1" 34 can securely communicate with the participants "F2" and "F3" 34 via the secure P2P communication, implemented for example as a secure messaging session (e.g., secure chat, secure email thread), a secure audio conference, a secure video conference, etc., based on distributed replication of the conversation object 42 and zero or more message objects 36 referenced in the message list 48. As described previously, the originating entity "F1" can securely communicate with the participants "F2" and "F3" even if the participants "F2" and "F3" do not have a two-way trusted relationship, in which case the network operating system 56 in the endpoint devices "B" and "C" 12 can indicate the presence of another "anonymous" participant in addition to the originating entity "F1".

Referring to FIG. 7C, assume that during the secure P2P communication between the originating entity "F1" and the participants "F2" and "F3", the participant "F2" creates a message executed in the endpoint device "B" 12, for example in the form of a GIF or PNG image from an IoT sensor or camera app, a text message via the messenger app 72, etc., that causes the application at the application layer 58 to send the message via the API 80 to the network operating system 56 executed in the endpoint device "B" 12. The conversation factory in the network operating system 56 executed in the endpoint device "B" 12 in operation 166 can update the conversation object 42 by causing creation of a message object 36 that defines the message received via the API (including in the message object 36, for example, any image 132, hypercontent 134, etc. supplied via the API) and adding the message ID (e.g., "M3") of the message object 36 to the message list 48 of the conversation object 42.

Assume in operation 168 that a conversation agent executed in the network operating system 56 of the endpoint device "B" 12 detects the anonymous participant (identifiable only in the network operating system 56 by its federation ID 18 but not identifiable at the application layer 58) does not have a two-way trusted relationship with the federation "F2" 12, and that the feature codes 102 in the conversation object 42 were set by the originating entity "F1" 12 for moderated invitations. Hence, the conversation agent can generate in operation 168 a request for an autonomic introduction of the anonymous participant for submission to the originating entity "F1" 34.

The network operating system 56 executed in the endpoint device "B" 12 in operation 170 can encrypt and sync the conversation object 42, the message object "M3" 36 generated by the participant "F2", and the request for autonomic introduction of the anonymous participant "F3" to the endpoint device "A" 12. In one example, the network operating system 56 executed in the endpoint device "B" 12 can "bundle" an update message (identifying the update in the conversation object 42), the message object "M3" 36, and the request for autonomic introduction into a single message that is encrypted, signed, and sent to the endpoint device "A" 12.

In another example illustrated in FIG. 7C, the network operating system 56 executed in the endpoint device "B" 12 in operation 170 can encrypt the update message with a corresponding temporal key "TK3", encrypt the message object "M3" 36 with a corresponding temporal key "TK4", and encrypt the request with a corresponding temporal key "TK5". As described previously, the network operating system 56 executed in the endpoint device "B" 12 in operation 170 can encrypt the temporal keys "TK3", "TK4", and "TK5" (identified herein as "TKi") with the secure public key "KeyP1_A", add the encrypted temporal keys "ENC(KeyP1_A)[TKi]" to the respective encrypted payloads, and cryptographically sign encrypted update message, encrypted message object, and encrypted request with the private key "prvKey_B" owned by the network operating system 56 in the endpoint device "B" 12. The encrypted and signed packets (e.g., the encrypted update message, the encrypted message object, and encrypted request) can be sent securely to the endpoint device "A" 12 via a secure peer-to-peer path, for example via a secure P2P data link or via a replicator device 16.

The network operating system 56 in the endpoint device "A" 12 in operation 172 can validate the secure packets as described above (including verifying no replay attack and verifying the digital signature), and can decrypt the secure messages by decrypting the temporal keys using the private key "prvKeyP1_A", and decrypting the payloads using the decrypted temporal keys "TK3", "TK4", and "TK5". Hence, the conversation factory in the network operating system 56 of the endpoint device "A" 12 in operation 172 can complete the synchronization of the conversation object 56 in response to the decrypted update message (adding the reference for the message object "M3" 36 to the message list 48), and display the message object "M3" 36 in the secure P2P conversation via the API 80 as a decrypted communication content item: the decrypted communication content item "M3" is presented to the originating entity "F1" via the application rendering the secure P2P communication (e.g., the messenger app 72, video conference app., etc.).

As noted previously, the participant "F3" is unable to see the message object "M3" 36 in the secure P2P connection because the participant "F3" has not yet established a two-way trusted relationship with the participant "F2" that owns the message object "M3" 36.

Hence, the network operating system 56 in the endpoint device "A" 12 in operation 172 can send the request by the participant "F2" for autonomic introduction of the anonymous participant "F3" to the originating entity "F1" via the API 80. In response to the network operating system 56 of the endpoint device "A" 12 detecting via the API 80 in operation 174 that the originating entity "F1" accepts the request for autonomic introduction, a connection agent executed in the network operating system 56 of the endpoint device "A" 12 in operation 176 can initiate the initiation of the autonomic introduction based on securely sending, according to the above-described salutation protocol, an invitation to establish a two-way trusted relationship with the meeting participant "F2", based on the invitation including the signet for the endpoint device "B" 12, including the public key "Key_B" and information for reaching the endpoint device "B" 12 (e.g., one or more IP addresses).

The network operating system 56 in the endpoint device "C" 12 in operation 176 can respond to the invitation from the originating entity "F1" to create a two-way trusted relationship with the participant "F2" in the secure P2P communication by storing the signet for the endpoint device "B" 12, forwarding the salutation request to the participant "F3" via the API 80, with an indication the salutation request is from the participant "F2" and approved by the originating entity "F1" of the identified secure P2P communication. Hence, the participant "F3" can be inclined to approve the salutation request based on the trust extended by the originating entity "F1" as having a corresponding two-way trusted relationship with the participant "F2" that is also part of the same secure P2P communication.

In response to the participant "F3" accepting the salutation request based on the conversation initiated by the originating entity "F1" 32, the network operating system 56 of the endpoint device "C" 12 in operation 178 can generate and send a secure salutation reply to the endpoint device "B" 12 based on the public key "Key_B" and the reachability information specified in the signet for the endpoint device "B" 12. The secure salutation reply can include a copy of the signet for the endpoint device "C" 12 or a reference for obtaining the signet from the endpoint device "B" 12, for example from the MCP device 14.

Hence, the reception of the secure salutation reply from the endpoint device "C" 12 causes the network operating system 56 in the endpoint device "B" 12 in operation 180 to validate the secure salutation reply as described above, securely store the signet for the endpoint device "C" 12, and establish a two-way trusted relationship between the federation entity "F2" 34 and the federation entity "F3" 34. The autonomic establishment of the two-way trusted relationship between the federation entities "F2" and "F3" 34 enables the respective endpoint devices "B" and "C" 12 to autonomically sync content objects (e.g., message objects 36) that are referenced in the conversation object for mutual display. Hence, message objects 36 owned by the participant "F2" in the secure P2P conversation can be instantly viewed by the participant "F3", and message objects 36 owned by the participant "F3" in the secure P2P conversation can be instantly viewed by the participant "F2".

The example autonomic introductions can be extended based on the originating entity "F1" causing the network operating system 56 in the endpoint device "A" 12 to set the feature code 102 in operation 118 (or a subsequent modification by the originating entity "F1") to enable open introductions. In one example, the originating entity "F1" 34 can tag the signets of personal friends known as sharing interest in making home-made pizzas with the dot tag "•PIZZA_LOVERS". The originating entity "F1" 34 can request generation of a "July 4th Pizza Party" event that invites the personal friends tagged in the contact list of signets with the dot tag "•PIZZA_LOVERS" 102c: the conversation agent in the network operating system 56 of the endpoint device "A" 12 can create the conversation object 42 for the event (e.g., in the form of a secure chat), where the conversation object includes a title field "July 4th Pizza Party" (or an associated image object referenced in an image field for an image advertisement or "flyer" advertising the party), a reference to the dot tag "•PIZZA_LOVERS", and a lifecycle ending after the scheduled event (e.g., the day after on Jul. 5, 2021). The autonomic attraction of invitees to the conversation object 42 as described in further detail in the above-incorporated application Ser. No. 17/372,607, in combination with the open introductions in the feature code 102, enables autonomic introductions between anonymous participants that are invited to the "July $4^{th}$ Pizza Party" secure chat initiated by the originating entity "F1" 34.

In contrast, the autonomic introductions can be disabled based on the originating entity "F1" causing the network operating system 56 in the endpoint device "A" 12 to set the feature code 102 to no autonomic introductions. The setting of no autonomic introductions enables the originating entity "F1" to establish a secure P2P communication for a chat session, etc., for example the originating entity soliciting a bid on a contract from multiple vendors invited as participants to the secure P2P communication. Hence, the first participant that responds to the originating entity can be deemed privately as the winning bid, without disclosure of any confidential information regarding the bid by the first participant to any of the other anonymous participants.

The use of no autonomic introductions also is effective for a secure P2P multicasting communication, for example where the originating entity "F1" is a company representative reporting confidential company financial data via a secure video presentation to trusted investors, vendors, etc. having registered as anonymous participants to the secure P2P communication: the anonymous participants can post questions to the company representative without any disclosure of the questions to any of the other anonymous participants. As described previously, all the security policies, feature codes, etc. are implemented by the network operating system 56 of the endpoint device 12 of the originating entity, and enforced in the network operating system 56 of each of the endpoint devices 12 participating in the secure P2P communication.

The use of no autonomic introductions also is effective in the case where the originating entity "F1" is a controller device for an Internet of Things (IoT) enabled system, where the secure P2P communication implemented by the conversation object 42 is for multiple IoT devices (as anonymous participants in the secure P2P communication) to report IoT-related sensor data to the controller device. Hence, the use of no autonomic introductions enables the originating entity "F1" (as an IoT controller device) to securely aggregate sensor data from multiple IoT devices registered as participants in the secure P2P communication, without any distribution of the sensor data between the participating IoT devices.

Referring to FIG. 7D, the execution of the secure P2P communication between the originating entity "F1" and the participating entities "F2" and "F3" enables the owner of any communication content item (e.g., the participant "P2" that owns the message object "M3" 36) to have sole and exclusive authority to modify and/or delete their communication content item. Hence, the participating entity "F2" in operation 182 can modify (or delete) the message object "M3" 36 and submit the modification via the prescribed API 80, causing an executable resource in the network operating system 56 of the endpoint device "B" 12 (e.g., a conversation factory) to modify (or delete) the message object "M3" 36, for example based on changing the hypercontent in the message object "M3" 36.

The conversation agent executed in the network operating system 56 of the endpoint device "B" 12 can respond to a modification in the message object "M3" 36 by sending in operation 184 a secure notification to the network devices "A" and "C" of the respective participants "P1" and "P3" (encrypted and signed as described above) specifying a differential hypercontent state describing the modification in the message object "M3" 36.

In the case of deletion of the message object "M3" 36 from the secure P2P conversation, the network operating system 56 of the endpoint device "B" 12 in operation 184 can modify the conversation object 42 to delete the corresponding message ID 38 for the message object "M3" 36 from the message list 48, causing the network operating system 56 of the endpoint device "B" 12 to securely send the secure notification specifying a differential hypercontent state describing deleting the message ID 38 for the message object "M3" 36 from the message list 48.

The network operating systems 56 of the respective endpoint devices "A" and "C" 12 in operation 186 can receive the respective secure data packets identifying the differential content state, and in response can validate, decrypt, and instantly update in operation 188 the message object "M3" 36 based on the differential content state. If in operation 184 the message object "M3" 36 is to be deleted from the conversation, the network operating system 56 of each endpoint device "A" and "C" 12 can instantly update in operation 188 the differential hypercontent state by deleting the message ID 38 for the message object "M3" 36 from the message list 48 from the conversation object 42.

Hence, the network operating systems 56 provide a cryptographically secure removal of the message object "M3" 36 from presentation to the originating entity "F1" or the participant "F3", since the security policy enforcement layer 78 can cause a dynamic update, via the prescribed API 80, that ensures that any display of the message object "M3" 36 at the application layer 58 is instantly removed; in other words, the message object "M3" 36 instantly "vanishes" from any display of the secure P2P communication. Further, the network operating systems 56 provide the cryptographically secure removal of the message object "M3" 36 from presentation to the entities "F1" and "F3", while still permitting the message object "M3" 36 to be stored securely "at-rest" for purposes, for example, of a distributed "vault" file storage by the endpoint device "B". If desired, the network operating system 56 in the endpoint device "B" 12 also can generate and send in operation 184 an instruction for instantaneous cryptographic removal of the message object "M3" 36, causing the network operating system 56 in the endpoint devices "A" and "C" to execute in operations 186 and 188 the instantaneous cryptographic removal of the message object "M3" 36 from any storage container of the memory circuit 94.

Hence, the example embodiments ensure that the originating entity retains sole and exclusive authority to control the secure P2P communication, and that each participating entity in the secure P2P communication generating any message object 36 retains sole and exclusive media content rights that comprise the authority to control the distribution, modification, and/or deletion of the message object 36 in any conversation.

The example embodiments also can protect the media content rights to any content in the conversation based on the originating entity "F1" preventing any recording or any "screen capture" or "screenshot" of any portion of the secure P2P conversation, and/or the enforcement by any participant that no message object 36 may be copied or recorded. The AI-based security agents 66, 68, and 70 in the network operating system 56 of any of the endpoint devices "A", "B", or "C" can either block any attempted screenshot, or (if screenshot blocking is not permitted by a device operating system of an endpoint device) the AI-based security agents in the network operating system 56 can mirror the screenshot and warn all participants of the screenshot, and provide with the warning an option to "outcast" the participant that took the screenshot. Additional details regarding protecting participants against unauthorized recording is described in further detail in commonly-assigned, copending application Ser. No. 17/361,538, filed Jun. 29, 2021, entitled "DISTRIBUTED SECURITY IN A SECURE PEER-TO-PEER DATA NETWORK BASED ON REAL-TIME SENTINEL PROTECTION OF NETWORK DEVICES", the disclosure of which is incorporated in its entirety herein by reference.

The example embodiments also enable the originating entity "F1" 34 to "split" an existing P2P communication (referred to as a "parent P2P communication") into one or more secure subordinate "child" P2P communications, for example to confine an off-topic conversation. For example, the originating entity "F1" 34 in operation 190 can send via the API 80 a request to generate a subordinate secure P2P communication (e.g., a "side" chat or "caucus room" for a streaming media conference) for the participants "F2" and "F3" (assume that participants "F4" through "F10" in the parent P2P communication do not want to participate in the secure child P2P communication).

The network operating system 56 in the endpoint device "A" 12 can respond to the request by generating in operation 192 a new conversation object 42 that identifies the federation ID "F1" 18 in the conversation ID for the child P2P communication, such that the originating entity "F1" 34 also retains sole and exclusive authority for the secure child P2P communication. The network operating system 56 in the endpoint device "A" 12 also adds to the new conversation object 42 the federation IDs "F1" (required as originating entity), "F2", and "F3" into the participant list 50. The network operating system 56 in the endpoint device "A" 12 also copies, from the message list 48 of the secure parent P2P communication, all references to message objects 36 that are owned by either the participants "F2" and "F3" of the secure child P2P communication. As with all data objects, the originating entity "F1" also can specify a prescribed lifecycle policy 24 indicating an expiration time for the secure child P2P communication.

The network operating system 56 in the endpoint device "A" 12 in operation 192 can sync the new conversation object 42 to the invited participants "F2" and "F3" via the respective endpoint devices "B" and "C", enabling the participants "F2" and "F3" in operation 194 to engage in the secure child P2P communication. As apparent from the foregoing, the network operating system 56 in the endpoint devices "B" and "C" can render any existing messages referenced in the new conversation object 42.

The originating entity "F1" 34 in operation 196 also can merge the secure child P2P communication into the secure "parent" P2P communication, where the network operating system 56 in the endpoint device "A" 12 can copy the message references, that are aggregated in the message list 48 of the conversation object 42 for the secure child P2P communication, into the message list 48 of the conversation object 42 of the secure parent P2P communication. Following copying of the messages references from the message list 48 of the secure child P2P communication into the message list 48 of the conversation object 42 for the secure parent P2P conversation, the network operating system 56 of the endpoint device "A" 12 in operation 196 can terminate the secure "child" P2P communication and cause a cryptographic removal of the conversation object 42 of the terminated child P2P communication from the endpoint devices "B" and "C" 12.

As apparent from the foregoing, termination of a secure P2P connection can result in the cryptographic removal of the associated conversation object from the participants "P2" and "P3", and optionally from the originating entity "F1", if desired (else the conversation object 42 can be stored in the endpoint device "A" 12 can be marked or tagged as terminated).

Referring to FIG. 7E, if in operation 198 the participant "F2" leaves the secure P2P communication started by the originating entity "F1", the network operating system 56 of the endpoint device "B" 12 generates and sends to the endpoint devices "A" and "C" a secure notification that the participant "F2" has departed from the secure P2P communication.

In response to the network operating system 56 of each of the endpoint devices "A" and "C" receiving in operation 200 the secure notification that the participant "F2" has departed from the secure P2P communication, the network operating system 56 of each of the endpoint devices "A" and "C" in operation 200 cryptographically removes autonomically from the message list 48 of the conversation object 42 all message references of message objects 38 owned by the departed participant "F2", without any authorization needed by the originating entity "F1". Depending on implementation, the notification also can cause the network operating system 56 of each of the endpoint devices "A" and "C" to cryptographically remove any copies of the message objects 38 owned by the departed participant "F2" (and previously referenced in the message list 48) from the endpoint devices owned by the federation entities "F1" (e.g., "A" and "A1") and "F3" (e.g., "C"), without any authorization needed by the originating entity "F1".

Similarly, the departure of the participant "F2" from the secure P2P communication in operation 200 causes the network operating system 56 of the endpoint device "B" 12 to cryptographically remove from the endpoint device "B" 12 all content from the secure P2P communication that was owned by the participants "F1" and "F3". Hence, the secure messages are removed instantly once the owner-participant has left the conversation, and the leaving participant similarly has all the secure messages owned by the other participants removed as well, ensuring no participant has any "left over" messages owned by another federation entity (unless referenced in another existing conversation object 42).

Hence, the originating entity "F1" in operation 202 can terminate the secure P2P communication at any time, causing the network operating system 56 in the endpoint device "C" 12 to instantly remove any message objects 36 owned by the originating entity "F1" in a cryptographically secure manner, and causing the network operating system 56 in the endpoint device "A" 12 to remove any message objects owned by the participating entity "F3" in a cryptographically secure manner.

If at any time any endpoint device (e.g., "C") 12 is disconnected from the secure private core network 10 and no other participating endpoint device (e.g., "A" or "B") is available via a local P2P data link, any of the above-identified operations can be autonomically executed by the autonomic synchronizer 52 in response to a disconnected endpoint device 12 reconnecting to the secure private core network 10 or another endpoint device 12 having a more recent version (e.g., hypercontent state) of any of the above-identified data objects 36 and/or 42, enabling the previously-disconnected endpoint device to reach "truth" (i.e., the most recent hypercontent state).

According to example embodiments, a network operating system executed in each endpoint device in a secure peer-to-peer data network provides exclusive and authoritative control for establishing a secure peer-to-peer communication in the secure peer-to-peer data network, where an originating entity retains sole and exclusive authority to control the secure peer-to-peer communication, each invited entity retains sole and exclusive authority to decide whether to accept or decline an invitation to join the secure peer-to-peer communication, and each participant retains sole and exclusive authority for enforcement of digital rights in any media content the corresponding participant creates and supplies to the secure peer-to-peer communication. The example embodiments provide distributed enforcement of privacy and media rights as selected by each participant in the secure peer-to-peer communication.

Although the example embodiments illustrate the pairwise topology of two-way trusted replicator devices as a mesh of trusted replicator devices, other topologies (e.g., star, tree, hybrid, etc.) can be used to deploy the pairwise topology of two-way trusted replicator devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

receiving, by a secure executable container executed by a processor in an endpoint device, a request from an originating entity for initiating a secure peer-to-peer communication with a second network entity via a secure data network, the originating entity having established a two-way trusted relationship with the endpoint device in the secure data network, the originating entity further having established a corresponding two-way trusted relationship with the second network entity in the secure data network;

processing, by the secure executable container, the request based on providing the originating entity a sole and exclusive authority to control the secure peer-to-peer communication, the sole and exclusive authority including selectively cryptographically removing a data structure originated by the originating entity from any network device having received the data structure via the secure data network; and initiating, by the secure executable container, the secure peer-to-peer communication based on securely sending, to the second network entity via the secure data network, a secure peer-to-peer invitation for the second network entity to join the secure peer-to-peer communication with the originating entity, the second network entity selectively joining the secure peer-to-peer communication.

2. The method of claim 1, wherein the two-way trusted relationship between the originating entity and the second network entity is based on the originating entity and the second network entity each having established a verified identity in the secure data network.

3. The method of claim 1, further comprising preventing, by the secure executable container, any executable resource in the endpoint device from accessing the secure data network, accessing any unencrypted form of any first secure data structure stored in the endpoint device, or accessing any second secure data structure generated for secure communications in the secure data network, without authorized access via a prescribed Application Programming Interface (API) required by the secure executable container.

4. The method of claim 3, wherein:

the receiving includes the secure executable container receiving the request via the prescribed API from an executable application configured for generating the request and executed within the endpoint device;

the processing including the secure executable container generating a conversation object as a data structure of a prescribed type, the generating of the conversation object including:

creating a conversation identifier that includes a federation identifier and a corresponding universally unique identifier, the federation identifier generated by the secure executable container as a verified identity during registration of the originating entity in the secure data network, the federation identifier identifying the originating entity in the secure data network;

the prescribed type defining the sole and exclusive authority owned by the originating entity.

5. The method of claim 4, wherein:

the receiving includes detecting in the request a third network entity to be added to the secure peer-to-peer communication via the secure data network, the originating entity having established a corresponding two-way trusted relationship with the third network entity in the secure data network;

the creating including adding respective federation identifiers of the second network entity and the third network entity to a subscriber list in the conversation object;

the initiating including sending a corresponding secure peer-to-peer invitation for the third network entity to join the secure peer-to-peer communication.

6. The method of claim 5, wherein:

the registration of the originating entity includes the secure executable container cryptographically generating a secure private key and a corresponding first secure public key associated with the endpoint device;

the two-way trusted relationship with the second network entity based on the endpoint device having received a second secure public key associated with a second endpoint device associated with the second network entity, and the second network entity having received the first secure public key;

the two-way trusted relationship with the third network entity based on the endpoint device having received a third secure public key associated with a third endpoint device associated with the third network entity, and the third network entity having received the first secure public key;

the initiating including securely sending the corresponding secure peer-to-peer invitation to the second endpoint device based on encrypting the corresponding secure peer-to-peer invitation using the second secure public key, and signing the corresponding secure peer-to-peer invitation using the secure private key;

the initiating further including securely sending the corresponding secure peer-to-peer invitation to the third endpoint device based on encrypting the corresponding secure peer-to-peer invitation using the third secure public key, and signing the corresponding secure peer-to-peer invitation using the secure private key.

7. The method of claim 5, further comprising:

receiving, by the secure executable container from the second network entity, a secure message based on the second network entity having joined the secure peer-to-peer communication; and decrypting the secure message and sending, via the API, a decrypted communication content item for presentation to the originating entity by one of said any executable resource;

wherein the third network entity is unable to identify the second network entity except as an anonymous participant of the secure peer-to-peer communication, or obtain the decrypted communication content item, without having established a corresponding two-way trusted relationship between the third network entity and the second network entity.

8. The method of claim 7, wherein the decrypted communication content item is a sensor value having been generated by a second endpoint device associated with the second network entity.

9. The method of claim 7, wherein the generating of the conversation object includes adding to the conversation object an introduction policy for one of no autonomic introductions between one or more of the anonymous participants in the secure peer-to-peer communication, moderated autonomic introductions between the anonymous participants, or open autonomic introductions between the anonymous participants, the method further comprising;

receiving, by the secure executable container, a request from the second network entity for initiation of an autonomic introduction for selective establishment of a corresponding two-way trusted relationship between the second network entity and the third network entity; and selectively initiating, by the secure executable container, the initiation of the autonomic introduction, based on a request approval received from the originating entity via the prescribed API;

wherein the establishment of the corresponding two-way trusted relationship between the second network entity and the third network entity enables the third network entity to obtain the decrypted communication content item.

10. The method of claim 3, further comprising:

receiving, by the secure executable container from the second network entity, a secure message based on the second network entity having joined the secure peer-to-peer communication;

decrypting the secure message and sending, by the secure executable container via the API, a decrypted communication content item for presentation to the originating entity by one of said any executable resource;

receiving, by the secure executable container, a secure notification that the decrypted communication content item has been modified by the second network entity; and modifying the decrypted content item presented to the originating entity based on the secure notification, without any authorization by the originating entity.

11. The method of claim 3, further comprising:

receiving, by the secure executable container from the second network entity, a secure message based on the second network entity having joined the secure peer-to-peer communication;

decrypting the secure message and sending, by the secure executable container via the API, a decrypted communication content item for presentation to the originating entity by one of said any executable resource;

receiving, by the secure executable container, a secure notification that the second network entity has departed from the secure peer-to-peer communication; and autonomically executing a cryptographically secure removal of the decrypted content item from presentation to the originating entity in response to the secure notification, without any authorization by the originating entity.

12. The method of claim 1, wherein the secure peer-to-peer communication comprises a third network entity having a corresponding two-way trusted relationship with the originating entity and having accepted a corresponding secure peer-to-peer invitation to selectively join the secure peer-to-peer communication, the method further comprising:

receiving, by the secure executable container, a second request to generate a subordinate secure peer-to-peer communication for the second network entity and the third network entity;

generating, by the secure executable container, the subordinate secure peer-to-peer communication, including providing the originating entity a corresponding sole and exclusive authority to control the subordinate secure peer-to-peer communication, and copying one or more message references in the secure peer-to-peer communication by the second network entity or the third network entity to the subordinate peer-to-peer communication.

13. The method of claim 12, further comprising:

merging, by the secure executable container in response to a third request from the originating entity, the subordinate secure peer-to-peer communication based on copying aggregated message references in the subordinate secure peer-to-peer communication into the secure peer-to-peer communication, and terminating the subordinate secure peer-to-peer communication.

14. The method of claim 1, wherein the secure peer-to-peer communication is one of a secure messaging session, or a secure streaming media conference.

15. One or more non-transitory tangible media encoded with logic for execution by a machine and when executed by the machine operable for:

receiving, by the one or more non-transitory tangible media implemented as a secure executable container that is executed by the machine implemented as an endpoint device, a request from an originating entity for initiating a secure peer-to-peer communication with a second network entity via a secure data network, the originating entity having established a two-way trusted relationship with the endpoint device in the secure data network, the originating entity further having established a corresponding two-way trusted relationship with the second network entity in the secure data network;

processing the request based on providing the originating entity a sole and exclusive authority to control the secure peer-to-peer communication, the sole and exclusive authority including selectively cryptographically removing a data structure originated by the originating entity from any network device having received the data structure via the secure data network; and initiating the secure peer-to-peer communication based on securely sending, to the second network entity via the secure data network, a secure peer-to-peer invitation for the second network entity to join the secure peer-to-peer communication with the originating entity, the second network entity selectively joining the secure peer-to-peer communication.

16. The one or more non-transitory tangible media of claim 15, further operable for preventing any executable resource in the endpoint device from accessing the secure data network, accessing any unencrypted form of any first secure data structure stored in the network device, or accessing any second secure data structure generated for secure communications in the secure data network, without authorized access via a prescribed Application Programming Interface (API) required by the secure executable container.

17. The one or more non-transitory tangible media of claim 16, further operable for:

receiving, from the second network entity, a secure message based on the second network entity having joined the secure peer-to-peer communication;

decrypting the secure message and sending, via the API, a decrypted communication content item for presentation to the originating entity by one of said any executable resource;

receiving a secure notification that the decrypted communication content item has been modified by the second network entity; and modifying the decrypted content item presented to the originating entity based on the secure notification, without any authorization by the originating entity.

18. The one or more non-transitory tangible media of claim 16, further operable for:

receiving, from the second network entity, a secure message based on the second network entity having joined the secure peer-to-peer communication;

decrypting the secure message and sending, via the API, a decrypted communication content item for presentation to the originating entity by one of said any executable resource;

receiving a secure notification that the second network entity has departed from the secure peer-to-peer communication; and autonomically executing a cryptographically secure removal of the decrypted content item from presentation to the originating entity in response to the secure notification, without any authorization by the originating entity.

19. The one or more non-transitory tangible media of claim 15, wherein the secure peer-to-peer communications is one of a secure messaging session, or a secure streaming media conference.

20. An apparatus implemented as a physical machine, the apparatus comprising:

non-transitory machine readable media configured for storing executable machine readable code implemented as a secure executable container;

a device interface circuit; and a processor circuit configured for executing the machine readable code, and when executing the machine readable code operable for:

receiving, by the secure executable container, a request from an originating entity for initiating a secure peer-to-peer communication with a second network entity via a secure data network, the apparatus implemented as an endpoint device, the originating entity having established a two-way trusted relationship with the endpoint device in the secure data network, the originating entity further having established a corresponding two-way trusted relationship with the second network entity in the secure data network, processing, by the secure executable container, the request based on providing the originating entity a sole and exclusive authority to control the secure peer-to-peer communication, the sole and exclusive authority including selectively cryptographically removing a data structure originated by the originating entity from any network device having received the data structure via the secure data network, and initiating, by the secure executable container, the secure peer-to-peer communication based on securely sending, to the second network entity via the secure data network, a secure peer-to-peer invitation for the second network entity to join the secure peer-to-peer communication with the originating entity, the second network entity selectively joining the secure peer-to-peer communication.

* * * * *